July 30, 1963
V. C. VANDERBILT, JR
3,099,154
SYSTEM FOR CONTROLLING A STRUCTURE ACCORDING
TO A PREDETERMINED PROGRAM OF OPERATION
Filed May 19, 1958
6 Sheets-Sheet 1
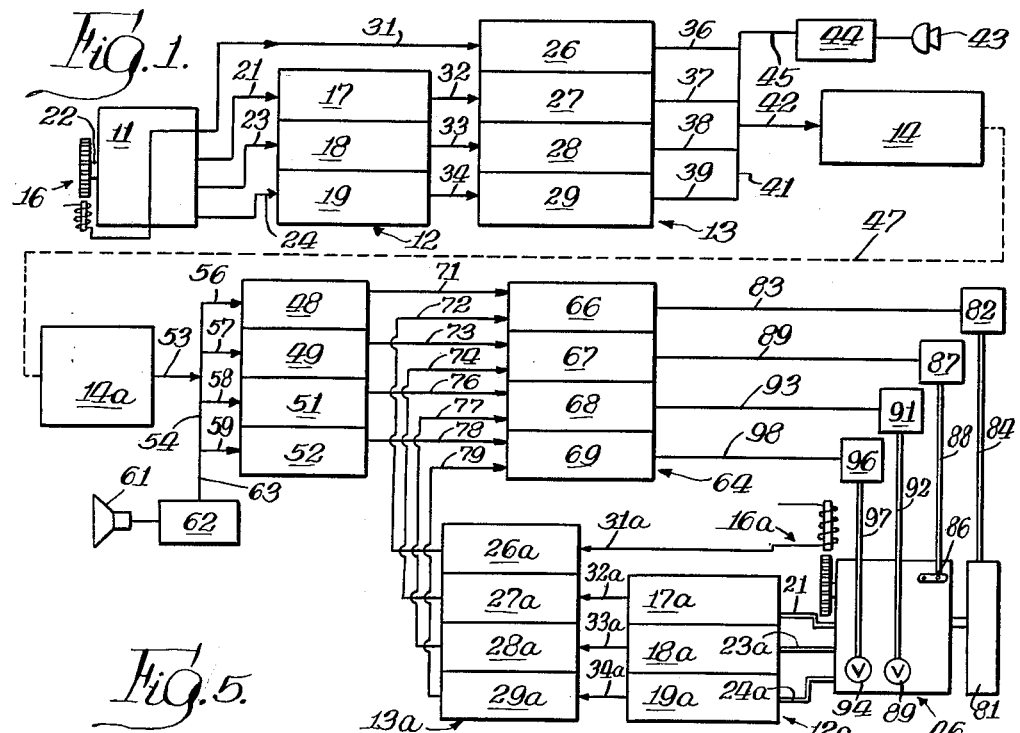
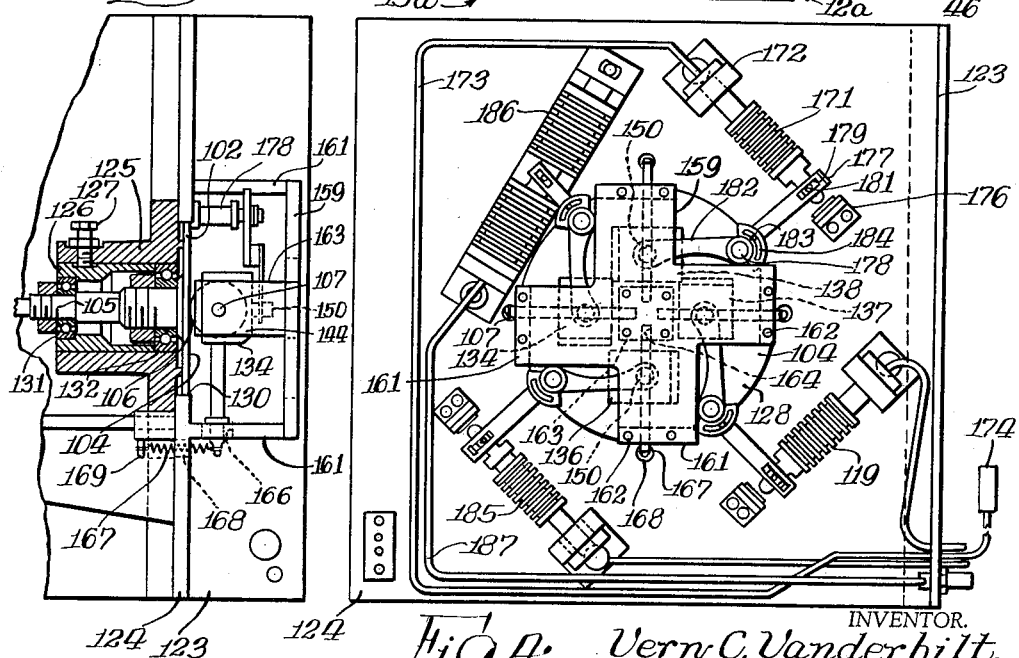
INVENTOR.
Vern C. Vanderbilt, JR.
BY Davis, Lindsey, Hibben & Noyes
Atty's.

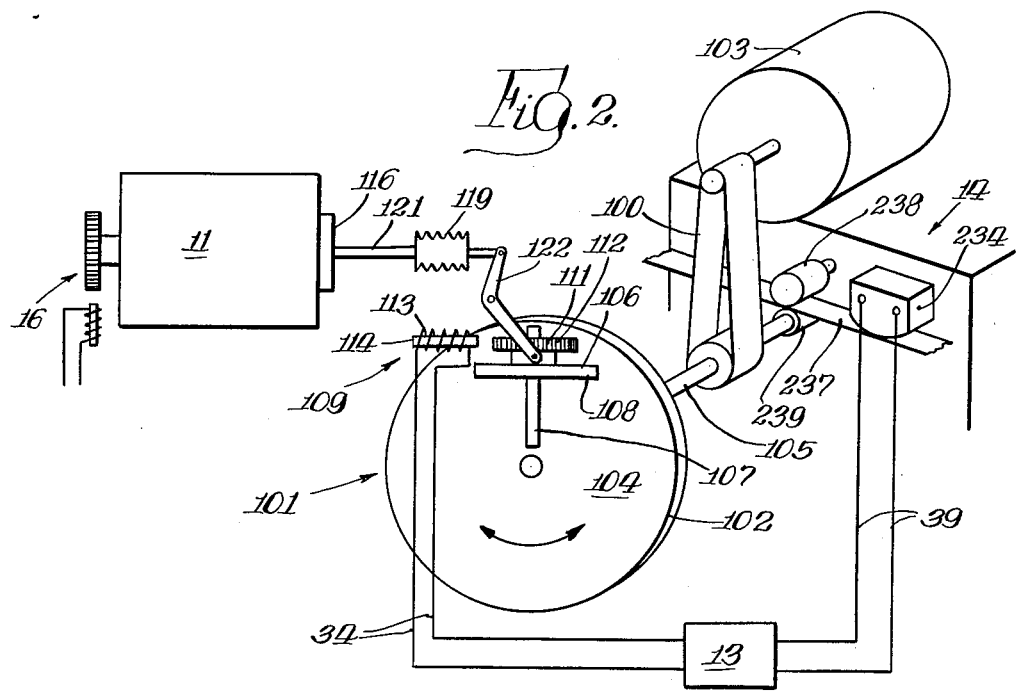
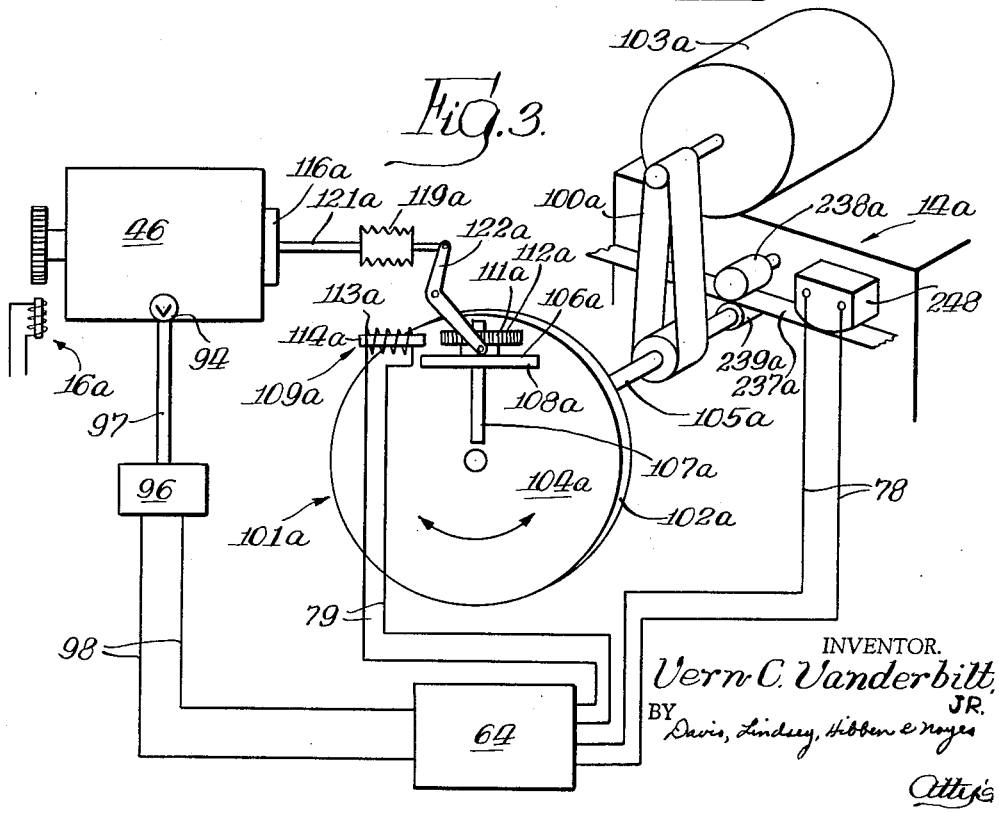

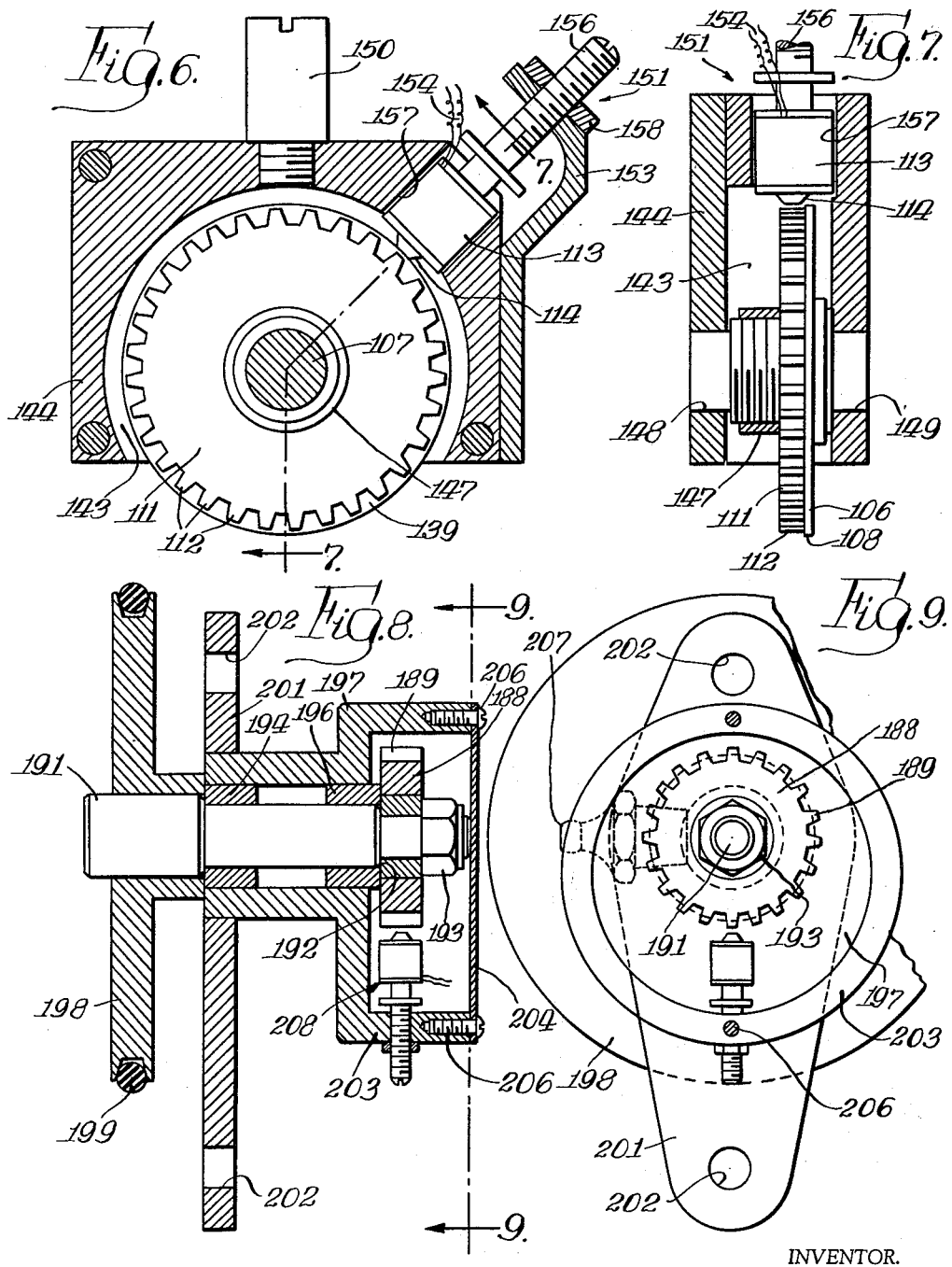

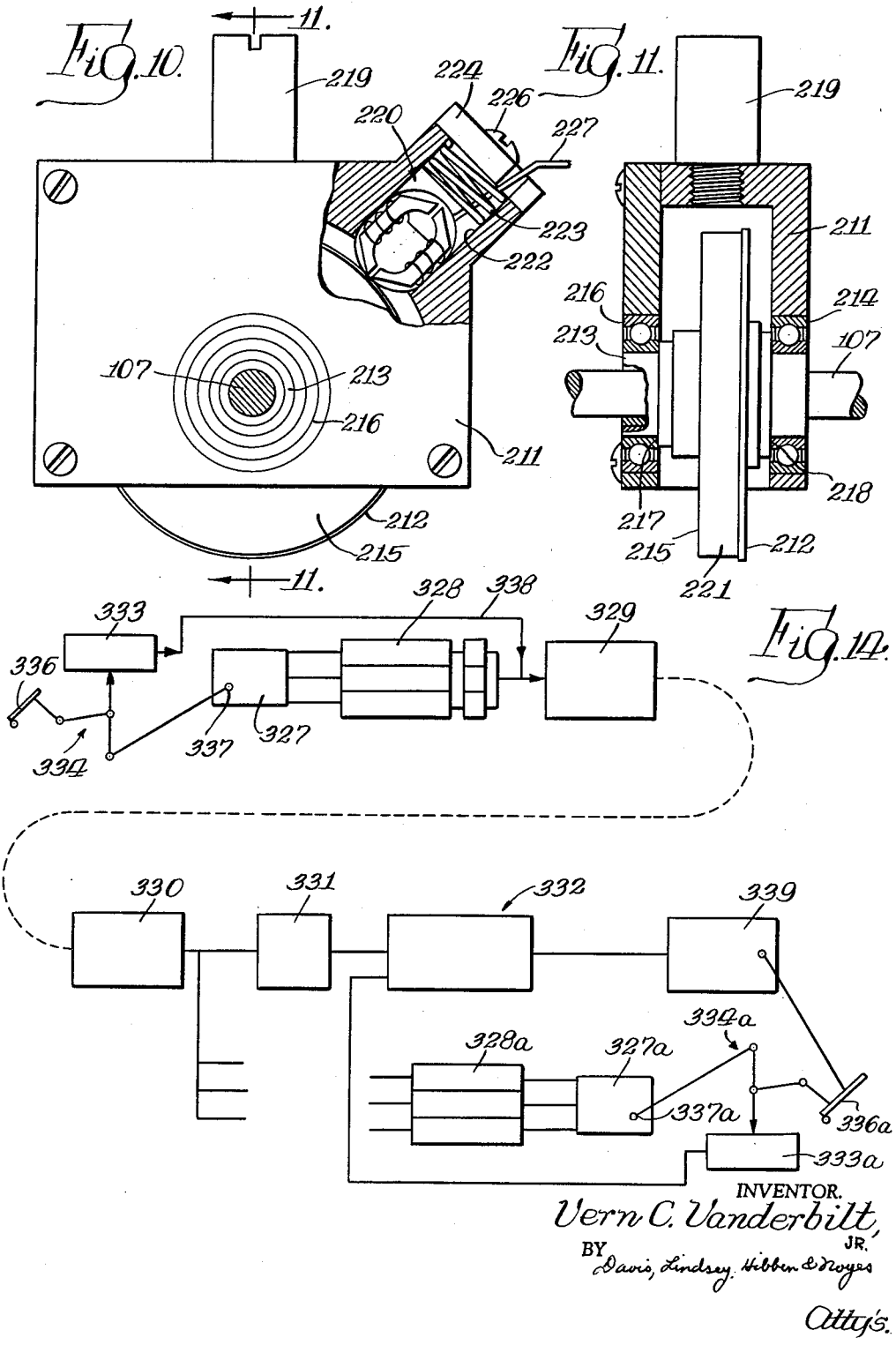

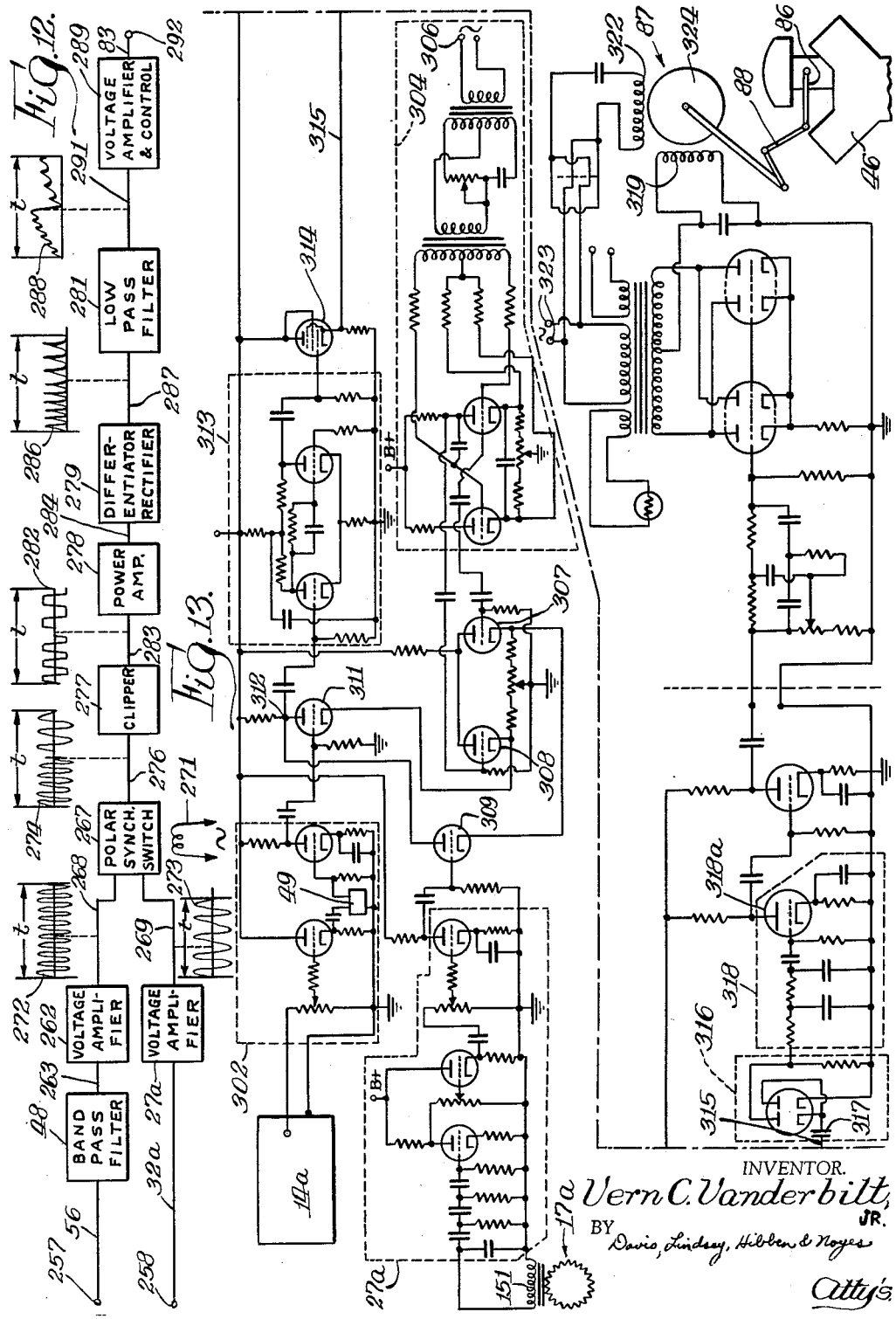

INVENTOR.
Vern C. Vanderbilt, JR.

United States Patent Office 3,099,154
Patented July 30, 1963

3,099,154
SYSTEM FOR CONTROLLING A STRUCTURE ACCORDING TO A PREDETERMINED PROGRAM OF OPERATION
Vern C. Vanderbilt, Jr., Hagerstown, Ind., assignor to Perfect Circle Corporation, Hagerstown, Ind., a corporation of Indiana
Filed May 19, 1958, Ser. No. 736,177
33 Claims. (Cl. 73—116)

This invention relates to a method of and apparatus for controlling a structure according to a predetermined program of operation.

The operation of structures in accordance with previously prepared programs has increased considerably in recent years as automation has grown in industrial production, in transportation and in many other areas including even the home. Conventional systems are able to control the performance of simple sequential operations such as are found in many production lines, and some are able to provide programmed control of a single infinitely variable, measurable quality of a structure. Simultaneously controlling a number of such variable qualities in a structure is a much more formidable undertaking, however, and exceeds the capabilities of most, if not all, prior systems.

A specific example will more clearly illustrate the complexity of the problems presented by programmed operation where more than a single variable quality is to be controlled. The specific example selected involves the testing of complex structures or mechanisms, such as engines, to determine their suitability and endurance for specific functions. This example will also serve in the subsequent disclosure to illustrate a typical environment in which structures embodying the present invention are well adapted to operate. It is emphasized, however, that the example is to be considered illustrative only.

In the testing of structures, many rigorous laboratory tests have been devised and are currently used to measure structural capabilities and limitations. For engines and the like, dynamometer test stands have long been used for testing. During these tests the subject engine may be subjected to a steady state load or to cyclical changes of load. It is well known, however, that these tests have not revealed data and results comparable to the data obtained from actual field or road tests and it is generally considered necessary to also conduct field or road tests on engines. This is so because many variable factors or qualities simultaneously affect an engine during a road test and each may vary swiftly. It is beyond the capabilities of most, if not all, conventional present day programming systems to control and vary the array of variable factors necessary to provide a substitute for the road test. Furthermore, the character of these changes, the number of factors involved, and the problem of synchronizing such changes in the laboratory have all contributed greatly to the difficulty of substituting laboratory tests for the field or road test. Ideally, of course, in the interests of uniformity of results, a repeatable laboratory test that closely approaches actual field or road conditions has long been sought and is most desirable. It will be shown hereinafter that this invention offers a unique solution to the specific problem of laboratory "road testing" but it also solves many problems broadly related to the field of programmed operation of a subject structure where one or more variable factors are involved.

Accordingly, it is the general object of the present invention to provide a novel system for controlling a subject structure according to a predetermined program of operation.

It is also a prime object of the invention to provide a novel system for repeatedly and faithfully reproducing in a subject structure a set of variable factors affecting the operation of the structure.

It is a further object of the invention to provide a novel system for repeatedly simulating in the laboratory a field or road test previously actually conducted.

Another object of the invention is to provide novel apparatus for preparing a record of the variations of one or more variable factors or qualities and for operating or controlling a subject structure according to that record.

Still another object of the invention is to provide novel transducer apparatus for sensing the presence and extent of variation of one or more variable factors or qualities and for producing recordable signals that vary according to the variations of said one or more qualities.

A further object of the invention is to provide combined recorder and transducer apparatus that is relatively uncomplicated, and portable, and that inherently compensates for one common source of error often found in prior systems.

Yet another object of the invention is to provide a novel control device for systems of the instant character which device controls operation of the structure to eliminate any difference between a recorded signal and a corresponding condition indicating signal originating at the subject structure.

Another object of the invention is to provide a novel electronic signal comparator device for comparing the frequencies of two signals and which provides an alternating current signal that indicates the magnitude of the frequency difference between the compared signals, and also indicates which of the signals has the higher frequency.

A still further object of the invention is to provide a novel method of providing programmed control of a subject structure.

Other objects and advantages of the invention will be apparent from the following description taken in conjunction with the accompanying drawings wherein:

FIG. 1 is a block diagram of apparatus embodying the features of the invention and adapted for simulated road testing of an engine;

FIG. 2 is a diagrammatic view of transducer and recording apparatus indicated in FIG. 1;

FIG. 3 is a view showing apparatus including transducer means and record playback apparatus of the control portion of the system shown in FIG. 1;

FIG. 4 is a plan view of a preferred form of transducer device shown diagrammatically in FIG. 2;

FIG. 5 is an end view of the transducer device shown in FIG. 4;

FIG. 6 is an enlarged sectional view of a part of the transducer device shown in FIG. 4;

FIG. 7 is a sectional view taken along the line 7—7 of FIG. 6;

FIG. 8 is an enlarged sectional view of a transducer device responsive to rotative speed;

FIG. 9 is a sectional view taken along the line 9—9 of FIG. 8;

FIG. 10 is an end view of a modification of the part of the transducer device shown in FIG. 6;

FIG. 11 is a sectional view taken along the line 11—11 of FIG. 10;

FIG. 12 is a block diagram of one form of frequency comparator device shown in FIG. 1;

FIG. 13 is a schematic view showing the circuit of one channel of the control portion of the system shown in FIG. 1;

FIG. 14 is a block diagram similar to FIG. 1 but of a modified system for simulated road testing of an engine;

Figure 15:
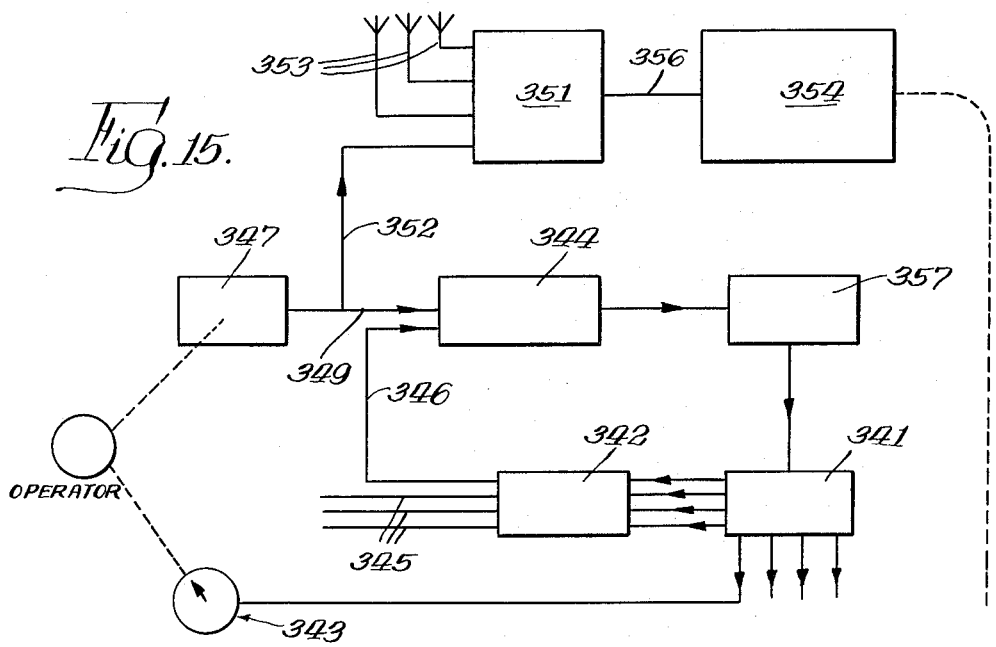
FIG. 15 is a block diagram of the recording portion of still another modified system for simulated road testing an engine.

The broad objects of the invention are accomplished by a novel system which prepares reproducing records and which operates subject structures by the records. Such a record is prepared by a portion of such system in advance of the actual programmed operation of the subject structure and the record may reflect either actual operational conditions found in a pilot structure or arbitrarily varied conditions such as might be assigned by personnel in a laboratory. The record is made by recording a signal on a conventional memory path and the signal recorded may include one or more signal components, each representing an individual quality or characteristic to be controlled in the subject structure.

In order to reflect actual operational conditions found in a pilot structure, one form of the system is provided with novel transducer means connectable to the pilot structure. The transducer means measures in the pilot structure the extent and variation of each of the qualities to be controlled in the subject structure and provides a distinctive signal for each such quality. Each signal so provided varies in some respect in accordance with the variation of its associated quality in the pilot structure.

In order to reflect variations arbitrarily assigned by laboratory personnel, another form of the system is provided with manually variable signal producing means which provides a distinctive signal for each quality to be controlled. All such signals are contemporaneously produced and are arbitrarily varied according to the program desired.

In both forms of the system the signals are immediately recorded on a memory path to provide a reproducing record thereof.

The record is thereafter used in a playback and control portion of the system to control the operation of a subject structure. Upon playback of the record, each recorded signal is reproduced, and fed to a control means for the structure. Faithful adherence to the predetermined program as recorded is accomplished by a feedback arrangement. Transducer means connectable to the subject structure senses the presence and extent of each quality in the subject structure and produces distinctive condition indicating signals representative thereof. The control means continuously compares each such condition indicating signal with a corresponding reproduced signal and controls the subject structure to eliminate any difference between corresponding signals.

A Complete Road Test System

Referring to the drawings, FIG. 1 shows in block form a complete system for practicing the present invention. The system there shown is a form of the invention used to program the operation of a subject structure, such as an engine on a laboratory test stand, in accordance with a record made of operational characteristics or qualities found in a pilot structure, such as an engine under road test.

To simulate actual road test conditions in the laboratory, it has been found that best results are obtained by controlling one or more key variable characteristics or qualities of the subject engine. Obviously, if a large number of such qualities are simultaneously controlled in the subject engine, a realistic simulated field or road test will be produced in the laboratory. In the present instance, the variations of four such qualities in the pilot engine are measured during operation of the pilot engine and are used to control the operation of the subject engine. Those qualities may be, for example, engine speed, manifold air pressure, coolant temperature, and lubricant or oil temperature. Of course, a greater or smaller number of such qualities could have been selected, since the selection of such qualities is governed by the reasons for the tests and the results to be achieved.

In the system shown in FIG. 1, the programming record is prepared by subjecting a pilot structure, such as an engine indicated generally by the block 11, to operating conditions, such as a road test. During operation the four engine qualities above enumerated are measured and their variations recorded by a recording portion of the system. If the test is a road test, the recording portion of the system is portable and capable of being mounted in a vehicle. The recording portion of the system includes transducer means, indicated generally at 12, signal amplification means indicated generally at 13, and recording means 14.

The transducer means 12 senses the presence and extent of the various qualities of the engine 11 and produces a distinctive signal representative of each. Each of the signals so produced varies in some respect in accordance with the variation of its associated quality. There are a number of transducer devices that could adequately function in this environment. However, when the recording portion of the system is portable, it is preferable that transducer means include the devices of the forms shown in FIGS. 4 and 5, and 8 and 9 of the drawings, hereinafter discussed in detail. The transducer means 12 in this instance includes, by way of example, a speed responsive device 16, a pressure responsive device 17, and temperature responsive devices 18 and 19. The speed responsive device 16 is shown in FIGS. 8 and 9 of the drawing and is mechanically connected to some rotatably driven member of the engine 11, such as the drive shaft 22 thereof to respond to engine speed. The remaining devices are parts of the transducer device shown in FIGS. 4 and 5. The pressure responsive device is connected into the manifold of the engine 11 by a tube 21 to respond to manifold pressure. The temperature responsive devices 18 and 19 are connected by tubes 23 and 24, respectively, into the coolant cavity and the crank case of the engine 11, to respond respectively to coolant temperature and to oil temperature. As the four qualities vary during engine operation, the devices 16, 17 18 and 19 are responsive to such variations and translate those variations into representative electrical signals.

In the instant transducer means, the signal outputs of the devices 16, 17, 18, and 19 are relatively weak. To increase signal strength to an optimum level, amplifier devices 26, 27, 28, and 29 of amplifier means 13 are respectively connected to the devices 16, 17, 18, and 19 by leads 31, 32, 33, and 34. The amplifier devices are conventional and provide signal intensity suitable for recording.

The output signal of the amplifier devices 26, 27, 28, and 29 are simultaneously recorded by the recorder 14 on a moving memory path. Although the recorder 14 can be a multiple track recorder, that is, one that records the several signals on a memory path in side-by-side relation, the instant system uses a single track recording head for recording the complete set of signals resulting from the test.

The signals provided by the devices 16, 17, 18, and 19 are distinctive and may be mixed into a composite signal and thereafter separated into individual signals. Although it is feasible to use other types of electrical signals in this environment, the transducer means 12, including the parts shown in FIGS. 4, 5, 8, and 9, provides frequency modulated signals, each assigned to a specific distinctive wave band. For convenience, standard telemetering wave bands are assigned to three of the devices shown. For example, the device 17, responsive to manifold air pressure, has an assigned band of 5400 cycles per second plus or minus 15%; the device 18, responsive to coolant temperature, has an assigned band of 3000 cycles per second plus or minus 7½%; and the device 19, responsive to lubricant or oil temperature, has an assigned band of 7350 cycles per second plus or minus 7½%. Since the speed of an engine during a field test may be expected to vary through a wide range, the device 16, responsive to speed or r.p.m. of the engine, is assigned the band from 200 to 2000 cycles per second.

Since the signals from the transducer means 12 are frequency modulated and are within distinctive bands, they can be mixed to form a composite signal for recording. To this end, leads 36, 37, 38, and 39 connect the amplifier devices 26, 27, 28, and 29 to a common bus 41, where the signals are mixed and conducted to the recorder through a lead 42.

The recorder 14 can be any one of several conventional types having a movable memory path, but is preferably a magnetic tape recorder. Confining the signals to standard telemetering channels or wave bands, discussed above, permits half track or half width recording on standard tape travelling at a standard speed, for example, 3¾ inches per second. Thus, the tape on a standard 10 inch reel will provide a record of eight hours of test.

It is also preferable that the tape transport mechanism of the recorder be interconnected with part of the transducer means 12. FIG. 2 of the drawing illustrates diagrammatically one way of interconnecting a tape transport and transducer means similar to that shown in FIG. 4. This interconnection avoids one source of error resulting from variation in the velocity of the memory path. This result will be demonstrated more fully hereinafter and is considered an important feature of the invention.

It is often desirable in testing, and other programmed operations, to record other data concerning the operation or test being performed. Such data might be, for example, comments of an observer concerning the operation or test. Such intelligence can be recorded as oral comments by the same recording head on the same tape track that carries the frequency modulated signals from the transducer. To this end, the system shown in FIG. 1 includes a microphone 43 coupled through an amplifier 44 by a lead 45 to the bus 41. To record oral comments by the same head, the amplifier 44 provides a signal of much less intensity than the signal from amplifier means 13, which will not interfere with signals provided by the transducer means 12. For example, a signal intensity of one-tenth the signal intensity from the amplifier means 13 is satisfactory. This arrangement has the further advantage of recording the spoken intelligence contemporaneously with the recording of signals from the transducer. Thus, an oral running account of the test is available when a test engine is later run in the laboratory or elsewhere.

The record prepared by the foregoing apparatus is used in a control portion of the system to directly control the subject structure, in this instance a laboratory test engine 46. Necessarily, the record produced by the recorder 14 must be transferred from the record producing apparatus to apparatus for controlling the subject engine 46. This step is indicated by the broken line 47 connecting the two portions of the apparatus. The record, in this instance a magnetic tape, may be either physically transferred from the recorder 14 to an independent play-back device, or, since most conventional recorders include play-back means, the recorder itself may be transferred to the control means portion of the apparatus. For this reason the play-back means is designated as 14a to indicate that it may be either an independent play-back means or the play-back means of the recorder 14.

Inasmuch as the signal recorded was a composite signal, the signal reproduced by the playback means 14a is also a composite signal. In the present system the composite signal is separated into reproductions of the original components thereof. To this end, the signal is conducted by a lead 53 to a bus or terminal 54 that is connected to a set of band pass filters 48, 49, 51, and 52 by leads 56, 57, 58, and 59, respectively. The band pass filters are conventional, each passing only that component of the composite reproduced signal that is within its preassigned band of frequencies. Thus, the output of each band pass filter is a reproduction of a respective signal produced by the transducer means 12. For example, the output of filter 48 is a reproduction of the signal provided by transducer element 17; that of filter 49 is a reproduction of the signal provided by element 16; that of filter 51 a reproduction of the signal from element 18; and that of filter 52 is a reproduction of the signal from 19.

The system also includes means for reproducing the spoken intelligence previously recorded. In this instance a speaker 61 is coupled through a filtering and amplifying device 62 to the bus or terminal 54 by a lead 63. This arrangement provides substantially contemporaneous reproduction of the spoken intelligence with the controlled operation of the motor from the record. Thus, any oral comments or notes recorded during the recording process are available to observers in the laboratory while the test engine 46 is being operated.

Although it is within the scope of the present invention to control the engine directly by the reproduced signal or signals, it is preferred that the engine 46 be controlled by a feed-back arrangement to insure faithful reproduction of the qualities in the subject structure, engine 46. FIG. 1 shows the preferred form of feed-back arrangement, a servo-loop in which the reproduced signals from the filters 48, 49, 51, and 52 are compared with similar condition-indicating signals from the engine 46, and in which the engine 46 is controlled by the differences that exist between corresponding signals.

The condition indicating signals, which are to be compared with the reproduced signals above discussed, are provided by transducer means adapted to sense the presence and extent of the assigned qualities in the subject engine 46. This transducer means must have the identical response of that used in making the recording and may, therefore, be either the same transducer means used in recording or another device that is adjusted to have the same response. For this reason the second transducer means is indicated as 12a to show that it may be either the transducer means 12 transferred from the pilot engine 11 to the subject engine 46 or another similar transducer means. For the same reason, the various transducer devices therein are designated 16a, 17a, 18a, and 19a, respectively. Likewise, amplifier devices for amplifying transducer signals, the leads interconnecting the amplifier devices and their asociated transducer devices, and the structure connecting the transducer means 12a to the engine 46 have all been given numbers of elements in the recording portion, but with "a" subscripts, since they correspond to and perform in the same manner as their counterparts in the preceding portion of the system. Also, memory path velocity may vary on playback and, therefore, the transducer means 12a and the memory path transport mechanism are interconnected, as in the recording portion of the system.

The reproduced signal from the output of each filter is compared with a corresponding amplified condition-indicating signal from transducer means 12a. This is accomplished by comparator means indicated generally at 64. The comparator means 64 comprises four comparator devices 66, 67, 68, and 69, which are, since the instant signals are frequency modulated, frequency comparator devices. The output of the filter 48 is conducted to the comparator device 66 by a lead 71 and the corresponding output from the amplifier 26a is conducted to the comparator device 66 by a lead 72. The outputs of the remaining filters and the corresponding outputs of the remaining amplifiers are likewise conducted to the remaining comparator devices by leads 73—74, 76—77, and 78—79, respectively. This system provides a comparator device for each of the qualities. However, where the qualities are in the nature of almost steady state qualities, that is, slowly varying qualities, a single comparator device can be adapted to compare more than one set of signals on a shared time basis. This is accomplished by conventional switching, well known in the art. The substitution of one shared-time frequency comparator device for two or more of those shown in the instant system is considered, therefore, within the scope of the present invention.

A preferred form of frequency comparator device is discussed more fully hereinafter. Broadly speaking, however, the preferred form of frequency comparator device provides an alternating current, line-frequency output when there is a difference in frequency between two signals that are compared thereby. The output is either substantially in phase or substantially 180° out of phase with respect to the phase of an associated power line, depending upon which frequency is the higher. If the signals have the same frequency, the output is direct current which effects no adjustment of the subject engine. Use of this form of frequency comparator in this environment is considered an important feature of the present invention, because the output is suited for actuating certain conventional types of electric servo-motors.

Finally, the system includes means adapted to regulate the various qualities in the engine in response to the output signals of the comparator means. In the system shown in FIG. 1, the subject engine 46 is connected to a dynamometer 81 which provides a load for the engine. Varying the load on the engine causes a change in the speed of the engine, as measured by the transducer device 16a. By tracing back through the system it will be apparent that the comparator device 66 compares signals representative of speed. Thus, its output is used to control the load provided by the dynamometer 81. The output of the comparator device 66 is conducted to a servo-motor 82 by a lead 83. The servo-motor 82 is a reversible, alternating current, two-phase motor connected so that its direction of rotation is responsive to the phase of the output signal from the comparator device 66. Rotation of the motor 82 adjusts, through the mechanism 84, the load provided by the dynamometer 81 in a sense tending to eliminate the difference between the compared speed signals.

The manifold air pressure of the engine 46 is regulated by adjusting the setting of a throttle lever 86. The throttle lever setting is adjusted by a servo-motor 87, similar to the servo-motor 82, through mechanism 88. The comparator device 67 is the engine manifold air pressure comparator, and its output signal is conducted to the motor 87 through a lead 89.

Both coolant temperature and lubricant temperature are regulated by valves in the coolant and lubricant systems, respectively. In this instance a valve 89 is connected in the coolant system of the engine, and is opened and closed by a servo-motor 91 by means of a mechanism 92 connected therebetween. The output of the comparator device 68 is conducted to the servo-motor 91 by the lead 93. Similarly, a valve 94, in the lubricant system of the engine 46, is opened and closed by the servo-motor 96 by means of a mechanism 97. The motor 96 is connected by a lead 98 to the comparator device 69. Both of the servo-motors 91 and 96 are similar to the motor 82.

To provide a simulated road test for laboratory engines using the above-described apparatus, a record is first made by the recording portion of the system. The record is produced by actually field or road testing the engine 11. During the road test the selected, variable qualities are continuously sensed by the transducer means 12, and the signals provided thereby, together with oral comments, if desired, are continuously and simultaneously recorded on the memory path by the recorder 14. The recording so produced is, of course, a permanent record and may be used at any time to program the operation of one or more subject engines.

The record is used by the play-back or control portion of the system shown to test the engine 46. In conducting the test from the record, the engine 46 is started and the selected qualities are continuously sensed by the transducer means 12a. At the same time the recorded composite signal is reproduced by the play-back means 14a. The reproduced signal is separated into reproductions of the component signals and they are continuously and simultaneously compared with corresponding condition indicating signals from the transducer means 12a. As the test progresses, the recorded oral notes are also reproduced by the speaker 61. If a difference exists between any reproduced signal and its corresponding condition indicating signal, a control signal from the comparator device 64 actuates its associated servo-motor in a sense to eliminate such difference. Thus, the operation of the engine 46 is made to conform substantially exactly to the previous operation of the engine 11.

It should be clearly understood that the specific structure just described is illustrative of but one use of the present invention, that use being the simulating of a field or road test of an engine. Obviously, the same or similar systems can be used to provide programmed operation of practically any device by controlling one or more variable qualities thereof.

Transducer Means

There are a number of types of signal generating transducers that are adapted to adequately function in systems embodying the present invention. Such transducers may include variable frequency electronic oscillating devices that are responsive to changes in a given quality and vary their frequency in accordance therewith, or the transducers may have electro-mechanical signal generator devices in which frequency is varied by varying their rotative speed. The latter type of transducer device is the preferred form for the system shown in FIG. 1 and for most of the other systems discussed hereinafter. FIGS. 2 and 3 diagrammatically illustrate this preferred form of transducer means, and FIGS. 4–11, inclusive, illustrate the structure thereof. Use of the electro-mechanical form of transducer means in preference to somewhat simpler electronic devices, in the present system, results in more accurate results, particularly where portability of the record producing portion of the system is required. This reason will be more fully discussed hereinafter in connection with the description of the transducer means-recorder combination.

The preferred form of transducer means is considered an important novel feature of the present invention. Broadly speaking, the transducer device comprises a variable speed drive, which in this case is a wheel-disk drive, for driving a rotatable armature of at least one signal generator, and at least one device that is operable in response to the variation of a variable quality to change the speed of the drive, and hence the armature, according to the variation of the quality. As the speed of the armature is varied, the frequency of the signal generated thereby is varied accordingly. The specific transducer means illustrated in FIG. 4 is adapted to provide four distinctive signals representing four different qualities of an engine or other structure and, therefore, has four signal generators. One of the signal generators is not used in the system shown in FIG. 1, however, but is rather a stand-by device for use in the event control of an additional quality is desired.

The transducer illustrated diagrammatically with other structures in FIG. 2 and indicated generally at 101, will be considered first, since it illustrates in simplified form parts of the transducer means 12 responsive to lubricant temperature. In the transducer 101 a wheel-disc variable speed drive, often called a Newton integrator, is used to drive an alternating current signal generator at varying rotative speeds to modulate the frequency of the output of the generator. The variable speed drive comprises, in this instance, a disk 102 that is rotatably driven by a motor 103 at substantially constant speed. In this instance a shaft 105 for the disk 102 is connected to the motor 103 by a belt 100. The disk 102 has a radially extending plane surface 104. The surface 104 could be conical, however, in the event a finer frequency range adjustment is desired. A wheel 106 is rotatively mounted on an axle 107 in axially slidable relation therewith. The longitudinal axis of the axle is substantially parallel to Since the signals from the transducer means 12 are frequency modulated and are within distinctive bands, they can be mixed to form a composite signal for recording. To this end, leads 36, 37, 38, and 39 connect the amplifier devices 26, 27, 28, and 29 to a common bus 41, where the signals are mixed and conducted to the recorder through a lead 42.

The recorder 14 can be any one of several conventional types having a movable memory path, but is preferably a magnetic tape recorder. Confining the signals to standard telemetering channels or wave bands, discussed above, permits half track or half width recording on standard tape travelling at a standard speed, for example, 3¾ inches per second. Thus, the tape on a standard 10 inch reel will provide a record of eight hours of test.

It is also preferable that the tape transport mechanism of the recorder be interconnected with part of the transducer means 12. FIG. 2 of the drawing illustrates diagrammatically one way of interconnecting a tape transport and transducer means similar to that shown in FIG. 4. This interconnection avoids one source of error resulting from variation in the velocity of the memory path. This result will be demonstrated more fully hereinafter and is considered an important feature of the invention.

It is often desirable in testing, and other programmed operations, to record other data concerning the operation or test being performed. Such data might be, for example, comments of an observer concerning the operation or test. Such intelligence can be recorded as oral comments by the same recording head on the same tape track that carries the frequency modulated signals from the transducer. To this end, the system shown in FIG. 1 includes a microphone 43 coupled through an amplifier 44 by a lead 45 to the bus 41. To record oral comments by the same head, the amplifier 44 provides a signal of much less intensity than the signal from amplifier means 13, which will not interfere with signals provided by the transducer means 12. For example, a signal intensity of one-tenth the signal intensity from the amplifier means 13 is satisfactory. This arrangement has the further advantage of recording the spoken intelligence contemporaneously with the recording of signals from the transducer. Thus, an oral running account of the test is available when a test engine is later run in the laboratory or elsewhere.

The record prepared by the foregoing apparatus is used in a control portion of the system to directly control the subject structure, in this instance a laboratory test engine 46. Necessarily, the record produced by the recorder 14 must be transferred from the record producing apparatus to apparatus for controlling the subject engine 46. This step is indicated by the broken line 47 connecting the two portions of the apparatus. The record, in this instance a magnetic tape, may be either physically transferred from the recorder 14 to an independent play-back device, or, since most conventional recorders include play-back means, the recorder itself may be transferred to the control means portion of the apparatus. For this reason the play-back means is designated as 14a to indicate that it may be either an independent play-back means or the play-back means of the recorder 14.

Inasmuch as the signal recorded was a composite signal, the signal reproduced by the playback means 14a is also a composite signal. In the present system the composite signal is separated into reproductions of the original components thereof. To this end, the signal is conducted by a lead 53 to a bus or terminal 54 that is connected to a set of band pass filters 48, 49, 51, and 52 by leads 56, 57, 58, and 59, respectively. The band pass filters are conventional, each passing only that component of the composite reproduced signal that is within its preassigned band of frequencies. Thus, the output of each band pass filter is a reproduction of a respective signal produced by the transducer means 12. For example, the output of filter 48 is a reproduction of the signal provided by transducer element 17; that of filter 49 is a reproduction of the signal provided by element 16; that of filter 51 a reproduction of the signal from element 18; and that of filter 52 is a reproduction of the signal from 19.

The system also includes means for reproducing the spoken intelligence previously recorded. In this instance a speaker 61 is coupled through a filtering and amplifying device 62 to the bus or terminal 54 by a lead 63. This arrangement provides substantially contemporaneous reproduction of the spoken intelligence with the controlled operation of the motor from the record. Thus, any oral comments or notes recorded during the recording process are available to observers in the laboratory while the test engine 46 is being operated.

Although it is within the scope of the present invention to control the engine directly by the reproduced signal or signals, it is preferred that the engine 46 be controlled by a feed-back arrangement to insure faithful reproduction of the qualities in the subject structure, engine 46. FIG. 1 shows the preferred form of feed-back arrangement, a servo-loop in which the reproduced signals from the filters 48, 49, 51, and 52 are compared with similar condition-indicating signals from the engine 46, and in which the engine 46 is controlled by the differences that exist between corresponding signals.

The condition indicating signals, which are to be compared with the reproduced signals above discussed, are provided by transducer means adapted to sense the presence and extent of the assigned qualities in the subject engine 46. This transducer means must have the identical response of that used in making the recording and may, therefore, be either the same transducer means used in recording or another device that is adjusted to have the same response. For this reason the second transducer means is indicated as 12a to show that it may be either the transducer means 12 transferred from the pilot engine 11 to the subject engine 46 or another similar transducer means. For the same reason, the various transducer devices therein are designated 16a, 17a, 18a, and 19a, respectively. Likewise, amplifier devices for amplifying transducer signals, the leads interconnecting the amplifier devices and their asociated transducer devices, and the structure connecting the transducer means 12a to the engine 46 have all been given numbers of elements in the recording portion, but with "a" subscripts, since they correspond to and perform in the same manner as their counterparts in the preceding portion of the system. Also, memory path velocity may vary on playback and, therefore, the transducer means 12a and the memory path transport mechanism are interconnected, as in the recording portion of the system.

The reproduced signal from the output of each filter is compared with a corresponding amplified condition-indicating signal from transducer means 12a. This is accomplished by comparator means indicated generally at 64. The comparator means 64 comprises four comparator devices 66, 67, 68, and 69, which are, since the instant signals are frequency modulated, frequency comparator devices. The output of the filter 48 is conducted to the comparator device 66 by a lead 71 and the corresponding output from the amplifier 26a is conducted to the comparator device 66 by a lead 72. The outputs of the remaining filters and the corresponding outputs of the remaining amplifiers are likewise conducted to the remaining comparator devices by leads 73—74, 76—77, and 78—79, respectively. This system provides a comparator device for each of the qualities. However, where the qualities are in the nature of almost steady state qualities, that is, slowly varying qualities, a single comparator device can be adapted to compare more than one set of signals on a shared time basis. This is accomplished by conventional switching, well known in the art. The substitution of one shared-time frequency comparator device for two or more of those shown in the instant system is considered, therefore, within the scope of the present invention.

A preferred form of frequency comparator device is discussed more fully hereinafter. Broadly speaking, however, the preferred form of frequency comparator device provides an alternating current, line-frequency output when there is a difference in frequency between two signals that are compared thereby. The output is either substantially in phase or substantially 180° out of phase with respect to the phase of an associated power line, depending upon which frequency is the higher. If the signals have the same frequency, the output is direct current which effects no adjustment of the subject engine. Use of this form of frequency comparator in this environment is considered an important feature of the present invention, because the output is suited for actuating certain conventional types of electric servo-motors.

Finally, the system includes means adapted to regulate the various qualities in the engine in response to the output signals of the comparator means. In the system shown in FIG. 1, the subject engine 46 is connected to a dynamometer 81 which provides a load for the engine. Varying the load on the engine causes a change in the speed of the engine, as measured by the transducer device 16a. By tracing back through the system it will be apparent that the comparator device 66 compares signals representative of speed. Thus, its output is used to control the load provided by the dynamometer 81. The output of the comparator device 66 is conducted to a servo-motor 82 by a lead 83. The servo-motor 82 is a reversible, alternating current, two-phase motor connected so that its direction of rotation is responsive to the phase of the output signal from the comparator device 66. Rotation of the motor 82 adjusts, through the mechanism 84, the load provided by the dynamometer 81 in a sense tending to eliminate the difference between the compared speed signals.

The manifold air pressure of the engine 46 is regulated by adjusting the setting of a throttle lever 86. The throttle lever setting is adjusted by a servo-motor 87, similar to the servo-motor 82, through mechanism 88. The comparator device 67 is the engine manifold air pressure comparator, and its output signal is conducted to the motor 87 through a lead 89.

Both coolant temperature and lubricant temperature are regulated by valves in the coolant and lubricant systems, respectively. In this instance a valve 89 is connected in the coolant system of the engine, and is opened and closed by a servo-motor 91 by means of a mechanism 92 connected therebetween. The output of the comparator device 68 is conducted to the servo-motor 91 by the lead 93. Similarly, a valve 94, in the lubricant system of the engine 46, is opened and closed by the servo-motor 96 by means of a mechanism 97. The motor 96 is connected by a lead 98 to the comparator device 69. Both of the servo-motors 91 and 96 are similar to the motor 82.

To provide a simulated road test for laboratory engines using the above-described apparatus, a record is first made by the recording portion of the system. The record is produced by actually field or road testing the engine 11. During the road test the selected, variable qualities are continuously sensed by the transducer means 12, and the signals provided thereby, together with oral comments, if desired, are continuously and simultaneously recorded on the memory path by the recorder 14. The recording so produced is, of course, a permanent record and may be used at any time to program the operation of one or more subject engines.

The record is used by the play-back or control portion of the system shown to test the engine 46. In conducting the test from the record, the engine 46 is started and the selected qualities are continuously sensed by the transducer means 12a. At the same time the recorded composite signal is reproduced by the play-back means 14a. The reproduced signal is separated into reproductions of the component signals and they are continuously and simultaneously compared with corresponding condition indicating signals from the transducer means 12a. As the test progresses, the recorded oral notes are also reproduced by the speaker 61. If a difference exists between any reproduced signal and its corresponding condition indicating signal, a control signal from the comparator device 64 actuates its associated servo-motor in a sense to eliminate such difference. Thus, the operation of the engine 46 is made to conform substantially exactly to the previous operation of the engine 11.

It should be clearly understood that the specific structure just described is illustrative of but one use of the present invention, that use being the simulating of a field or road test of an engine. Obviously, the same or similar systems can be used to provide programmed operation of practically any device by controlling one or more variable qualities thereof.

*Transducer Means*

There are a number of types of signal generating transducers that are adapted to adequately function in systems embodying the present invention. Such transducers may include variable frequency electronic oscillating devices that are responsive to changes in a given quality and vary their frequency in accordance therewith, or the transducers may have electro-mechanical signal generator devices in which frequency is varied by varying their rotative speed. The latter type of transducer device is the preferred form for the system shown in FIG. 1 and for most of the other systems discussed hereinafter. FIGS. 2 and 3 diagrammatically illustrate this preferred form of transducer means, and FIGS. 4–11, inclusive, illustrate the structure thereof. Use of the electro-mechanical form of transducer means in preference to somewhat simpler electronic devices, in the present system, results in more accurate results, particularly where portability of the record producing portion of the system is required. This reason will be more fully discussed hereinafter in connection with the description of the transducer means-recorder combination.

The preferred form of transducer means is considered an important novel feature of the present invention. Broadly speaking, the transducer device comprises a variable speed drive, which in this case is a wheel-disk drive, for driving a rotatable armature of at least one signal generator, and at least one device that is operable in response to the variation of a variable quality to change the speed of the drive, and hence the armature, according to the variation of the quality. As the speed of the armature is varied, the frequency of the signal generated thereby is varied accordingly. The specific transducer means illustrated in FIG. 4 is adapted to provide four distinctive signals representing four different qualities of an engine or other structure and, therefore, has four signal generators. One of the signal generators is not used in the system shown in FIG. 1, however, but is rather a stand-by device for use in the event control of an additional quality is desired.

The transducer illustrated diagrammatically with other structures in FIG. 2 and indicated generally at 101, will be considered first, since it illustrates in simplified form parts of the transducer means 12 responsive to lubricant temperature. In the transducer 101 a wheel-disc variable speed drive, often called a Newton integrator, is used to drive an alternating current signal generator at varying rotative speeds to modulate the frequency of the output of the generator. The variable speed drive comprises, in this instance, a disk 102 that is rotatably driven by a motor 103 at substantially constant speed. In this instance a shaft 105 for the disk 102 is connected to the motor 103 by a belt 100. The disk 102 has a radially extending plane surface 104. The surface 104 could be conical, however, in the event a finer frequency range adjustment is desired. A wheel 106 is rotatively mounted on an axle 107 in axially slidable relation therewith. The longitudinal axis of the axle is substantially parallel to the surface 104 and extends generally radially relative to the disk 102. Also, the axle 107 is spaced from the surface 104 a distance equal to the radius of the wheel 106, so that the peripheral surface 108 of the latter will frictionally and continuously engage the surface 104 as the wheel 106 is moved or shifted in or out with respect to the center of the surface 104. Thus, the rotative speed of the wheel 106 will be varied relative to the rotative speed of the disk 102 by moving the wheel along the axle 107.

A signal generator, indicated generally at 109, is driven by the wheel 106. The signal generator 109 comprises a rotatable armature, in this instance a toothed disk 111 of magnetic material having one or more teeth 112, a coil 113, disposed adjacent the path of such teeth, and a permanent magnet 114 disposed in the coil. The armature or disk 111 is connected directly to the wheel 106 and rotates in unison therewith. The operation of this generating device is well known in the art and needs little, if any, explanation. It is sufficient to say that, as the armature is rotated by the wheel 106, the teeth vary the magnetic field provided by the magnet 114 and thereby cause an alternating current signal to be induced in the coil 113. The frequency of the signal generated is, of course, a function of the number of teeth 112 and the rotative speed of the armature 111. Thus, knowing the rotative speed of the wheel 102, it is a simple matter to limit the frequency of the output signal to a specific band by providing a calculated number of teeth on the armature and confining the extent of shifting of the wheel 106 to calculated limits with respect to the center of the disk 102.

The transducer 101 is provided with means for sensing the presence and extent of the lubricant temperature and for shifting the disk 106 along the axle 107 to vary the frequency of the signal in accordance with variations of the lubricant temperature. Temperature is sensed by an element 116 that is connectable in the lubricant system of the pilot engine 11. The element 116 actuates a bellows 119 by fluid action through a tube 121 extending therebetween. As the bellows 119 extends and retracts, it shifts the wheel 106 radially on the axle 107 by means of a bell crank or lever arrangement 122 connected therebetween, and the frequency of the signal is varied accordingly.

FIG. 3 illustrated the playback portion of the system and shows a transducer of the foregoing character mounted on the subject engine 46. The transducer is the same as that shown in FIG. 2 and corresponding parts thereof have been given the same numbers with "a" subscripts.

FIGS. 4 and 5 illustrate in more detail transducer means incorporating the foregoing structure and adapted to provide signals representing a plurality of qualities. The transducer means shown in FIGS. 4 and 5 is carried by a frame 123. The frame 123 has a rigid base plate 124 to which is secured a bearing housing 125 (see FIG. 5). In the housing 125 is mounted a sleeve 126 that is held rotatively and axially fixed relative to the frame by a set screw 127. The drive disk 102 is rigidly secured to the inner end of the drive shaft 105 and the latter is rotatively journalled in a pair of ball bearings 131 and 132 mounted in the sleeve 126. The outer end of the shaft 105 is rotatively driven by a motor 103, shown in FIG. 2. The disk 102 is disposed in a circular opening 130 in the base plate 124 with its friction driving surface 104 exposed.

As mentioned previously, the instant transducer means is adapted to provide signals representative of a plurality of variable qualities. To this end, four alternating current signal generating devices 134, 136, 137 and 138 are provided, and are spaced about the center of the disk 102, the devices being illustrated diagrammatically at 109 in FIG. 2. Each of the generating devices is rotatively driven by the disk 102. The four generating devices and much of their associated structures are generally alike, except for specific differences hereinafter mentioned, and, therefore, a detailed description of one, signal generating device 134 and its associated structure, is felt to be sufficient as a disclosure for all.

FIGS. 6 and 7 show the signal generating device 134 and some of its associated structure. The device 134 comprises the friction wheel 106, the armature 111 of magnetic material and the pick-up assembly, including the coil 113 and magnet 114, hereinafter described in more detail. The armature 111 has at least one and in this instance a plurality of peripheral radially extending teeth 112 and is rigidly engaged with and preferably in side-by-side relation to the friction wheel 106 to form a unitary assembly. The armature-wheel assembly is encased within a space 143 provided in a housing or cradle 144. The wheel 106 projects from the cradle 144 to expose its peripheral surface 108 for engagement with the disk 102. The cradle 144 and the armature-wheel assembly are mounted on the axle 107 and are slidable as a unit therealong. The armature-wheel assembly is also rotatable on the axle 107, the axle 107 extending through a hub 147 of the wheel-disk assembly and through openings 148 and 149 in opposite sides of the housing 144 substantially parallel to the surface 104.

The housing or cradle 144 has at its top a pin 150 by which the signal generating device 134 is moved along the axle 107, and also carries a pick-up coil and magnet assembly 151. The assembly 151 comprises the permanent magnet 114 around which is disposed the coil 113 having a pair of leads 154. The coil and magnet are rigidly mounted on the end of a threaded rod 156 and are disposed in an opening 157 through a corner of the cradle 144 with the end of the magnet adjacent the path of the teeth 112. The assembly 151 is adjustably held in this position by a support bracket 153 rigidly secured to an edge of the cradle 144 below the opening 157. The rod 156 threadedly engages the upper end of the bracket 153 and the assembly 151 is locked in position by a lock nut 158.

The only substantial differences between the signal generating devices 134, 136, 137 and 138 are their armature disks. Each armature disk has a distinctive number of teeth, the number being calculated in each case so that the signal generated thereby will be within a distinctive frequency band when the disk 102 rotates at optimum speed. The frequency of the signal at any instant is equal to the rotative speed of the disk 102 times the ratio of the diameter of the path of the wheel on the disk to the diameter of the wheel, times the number of teeth on the armature.

The four signal generating devices 134, 136, 137 and 138 are carried on their axles by the frame 123 and are disposed in spaced relation about the center of the disk 102 with the peripheries of their associated wheels urged into frictional engagement with the surface 104. To this end the frame 123 is provided with a somewhat cross-shaped top plate 159 that is spaced from the surface 104 by end supports 161 positioned at the outer end of each arm of the cross. Each end support 161 has one edge rigidly secured to the top plate 159 and the opposite edge rigidly secured to the base plate 124, as by screws 162.

The top plate 159 supports the inner end of each of the axles 107, and for this purpose is provided with a center support member 163 having one face rigidly secured thereto, as by screws. Its opposite face is spaced slightly from the surface 104 of the disk 102. The center support member 163, in this instance, is substantially square in cross section and the center of its cross section is in alignment with the center of the disk 102. Furthermore, the four side faces of the member 163 are generally parallel with corresponding end supports 161 and are each provided with a radially inwardly extending hole 164, for receiving one end of an associated axle. Elongated slots 166 are provided in the end supports 161 for accommodating the opposite ends of the axles. The slots 166 and corresponding holes 164 are generally radially aligned with respect to the disk 102, the slots 166 extending inwardly toward the disk 102, as seen in FIG. 5. Thus, each of the holes 164 supports the one end of an associated axle and the opposite end of the axle is held in general radial alignment by its associated slot 166, but is permitted thereby to move a limited amount toward and away from the surface 104 of the disk 102. The signal generating devices are all mounted on their associated axles between the center support member 163 and the end supports and between the top plate 159 and the base plate 124.

Of course, the signal generating devices are each mounted with the exposed portion of their wheels facing the surface 104 for frictional engagement therewith. To insure proper frictional engagement therebetween, the outer ends of the axles are resiliently urged toward the disk 102 by springs, one of which is shown at 167 in FIG. 5. As shown in FIGS. 4 and 5 the axles all extend through their associated slots 166 and beyond. One end of the spring 167 is hooked over the outer end of its axle and the opposite end of the spring projects through a hole 168 in the base plate and is hooked over a pin 169 rigid with the frame. Each of the other axles are similarly spring biased.

The response of the instant transducer means to variations of variable qualities is provided by the bellows-pressure line devices shown in FIG. 4. There are four such devices, one for regulating the signal frequency of each of the signal generating devices. Such regulation is accomplished by sliding the signal generating devices along their associated axles. As in the case of the signal generating devices, these bellows devices are quite similar, and a description of one is all that is necessary for an understanding of all. Therefore, for the purposes of this description, the device shown in the upper right hand corner of FIG. 4, including a bellows 171, will be considered herein.

The device, including the bellows 171, is temperature responsive, that is, it is adapted to sense the extent of temperature changes and to translate those changes into a movement for shifting the rotative speed of the signal generating device 138 to which it is connected. The bellows 171 has some inherent resiliency and is mounted adjacent the device 138 on the base plate 124. One end of the bellows 171 is secured in a bracket 172, which is in turn rigidly fixed to the base plate 124. The opposite end of the bellows is permitted to move in and out relative to the bracket 172. A fluid filled elongated tube 173 is provided at one end with a heat sensitive bulb 174 and is connected at its other end into the fixed end of the bellows 171. The tube 173 is, of course, sufficiently long to permit the bulb 174 to be connected in a structure, such as, for example, the coolant system of an engine. Changes in temperature in the coolant system will then be reflected by extensions and retractions of the bellows 171. Extension of the bellows is resisted by a stop device in the form of a leaf spring 176 secured to the base plate 124 having an end in line with the free end of the bellows 171. The spring stop device 176 is adapted to insure a direct proportion within a predetermined range between temperature changes and the corresponding response of the bellows 171.

The extension and retraction of the bellows swings a lever 177 about a pivot 178 to which one end of the lever is connected. The pivot 178 is rigidly secured to the base plate 124. The opposite or outer end of the lever 177 is provided with a longitudinally extending slot 179 in which a pin 181, on the free end of the bellows, engages to swing the lever around the pivot. A second lever 182 is also connected at one end to the pivot 178. The other end of the lever 182 engages the pin 150 on the signal generating device 138. The lever 177 is provided with a pin 183 that engages in an arcuate slot 184 in the one end of lever 182. The center of curvature of slot 184 is concentric with the pivot 178. Engagement of the pin 183 with the lever 182 at the end of the slot 184 occurs when the free end of the bellows engages the spring stop device 176, and thereafter provides a bell crank action that moves the generating device 138 radially outwardly on its axle as the bellows extends against the resistance of the spring. The levers 177 and 182 thus constitute the bell crank 122 shown in FIG. 2. In the instant case this occurs when the temperature being measured is increasing. Upon a decrease in temperature the fluid pressure on the bellows 171 decreases and the action of the spring stop 176 urges the bellows to retract, thereby allowing the generating device 138 to be shifted radially inwardly as will be hereinafter explained. In this way the frequency of the signal generated is modulated according to the variation of the temperature being measured.

The linkages above described, for connecting the bellows to its associated signal generator, may have some potential lost motion, or backlash, upon the reversal of the sense of quality being measured. Any uncorrected lost motion in this structure is, of course, highly undesirable because it will result in a false signal response. It has been found that, if the axles of the signal generating devices are canted slightly from a true radial direction so that their friction wheels are slightly non-tangential to the circle of their tracks on the surface 104, a component of force is provided on each of the friction wheels which always takes up such lost motion in the same direction independently of the direction of movement of the signal generators on their axles. In this way, lost motion is conveniently corrected in the instant device.

The same construction that eliminates backlash also shifts the signal generating devices inwardly on their axle as their bellows retracts. Thus, the lower end of the slot 184 is in engagement with pin 183 when the bellows 171 is in engagement with the spring stop 176. Consequently, when the temperature increases the generating device 138 is positively moved outwardly by the bellows and when the temperature decreases the device 138 is permitted to move inwardly.

Variable qualities other than temperatures can of course be handled by the instant transducer means. The bellows 186 in the upper left corner of FIG. 4, and its associated structure, is adapted for use in connection with manifold air pressure in an engine. The bellows 186 is connected by its tube 187 into the manifold to respond to the pressure therein and, operating in substantially the same manner as the previously described bellows 171, provides a frequency modulated signal that is representative of changes in manifold air pressure. The bellows 119 is temperature responsive and is connectable in the lubricating system to be responsive to lubricant temperature. The bellows 185 and its associated structure is a stand-by device in the present instance. Obviously, using the above disclosed structure as a basis, adaptations can be made to measure other variable qualities.

It is evident from the physical arrangement of the instant transducer means that, although adapted to measure four qualities in this case, simple rearrangement of the signal generators and their associated actuating devices about the center of the disk 102 will permit a greater or lesser number of signal generators and associated structures to be incorporated in the transducer means. It is also evident that the transducer means described above inherently relates the signal frequencies of the various signal generators to each other. In other words, the bandwidth and spacing-between-bands relationship is maintained by virtue of the common drive, the disk 102. This feature of the transducer means is important in portable devices and in situations where the power source for driving various elements of the system may be variable. The advantage derived therefrom will be more fully apparent from the description directed to the transducer-recorder combination, discussed later.

While the bellows 185 could be adapted to be responsive to the speed of the engine, the preferred form of speed responsive means is shown in FIGS. 8 and 9. Thus, FIGS. 8 and 9 illustrate in detail the device 16 of FIG. 1, which provides a frequency modulated signal representative of the rotative speed of a rotatable member. In general, the device 16 is a signal generator of the form provided in the transducer means 109, but is modified to be directly driven by the rotatable member rather than by a disk-wheel drive. This transducer comprises an armature or disk 188 of magnetic material having a predetermined number of peripheral teeth 189. The armature 188 is rigidly fixed in one end of a shaft 191 and held against a shoulder 192 thereon by a nut 193. The shaft 191 is rotatively journalled in sleeve bearings 194 and 196 mounted in a housing 197. The end of the shaft 191 opposite disk 188, extends from the housing 197 to be connected to the rotatable member 22 shown in FIG. 1. In the present instance the shaft 191 is provided with a drive pulley 198 that connects with rotatable member 22 by a belt 199.

The housing 197 is non-rotatable and is provided with a flange portion 201 having bolt holes 202 by which the housing is mounted in fixed position. Opposite the flange 201, the housing 197 has a circular wall portion 203 that extends beyond and encases the disk 188 together with the one end of the shaft 191. A circular cover plate 204 is secured to the edge of the wall portion 203 by screws 206 and closes the opening at the end of the housing formed by the wall 203. A grease fitting 207 may be mounted in the housing to supply lubricant to the shaft 191 where it coacts with the bearings 194 and 196.

A signal pick-up device 208 is adjustably mounted in the wall 203 adjacent the path of the teeth 189. The pick-up device 208 is substantially the same as the pick-up device 151 and further description thereof is not believed necessary.

Because of the connection between the instant transducer device and a rotating member such as the drive shaft of the engine 11, provided by the belt-pulley arrangement, the frequency of the signal generated will be modulated in accordance with changes in rotative speed of the member. In the case of engines, the belt 199 could instead be connected to the cam shaft, the fan or any other element that is driven by the engine. The optimum number of teeth 198 and the optimum relationship of the relative diameter of pulley 198 to the diameter of the rotatable member to which it is connected are easily calculated by well known formulas so that the frequency range of the signal generated thereby will be within a predetermined band.

Another form of signal generating device that may be used in the speed responsive transducer device shown in FIGS. 8 and 9, or in the transducer means shown in FIGS. 4 and 5, is shown in FIGS. 10 and 11. For illustrative purposes, FIGS. 10 and 11 show this form of signal generating device adapted to be used in the transducer means shown in FIGS. 4 and 5. Broadly speaking, this form of signal generator is a modified magnetic recorder-playback device.

The signal device shown in FIGS. 10 and 11 comprises a cradle or housing 211 that is similar to the cradle 144 shown in FIGS. 6 and 7, a friction wheel 212 and an armature 215 mounted in the housing 211 rigidly on a hub 213 through which an axle, such as 107, extends, and pick-up means cooperable with the armature 215 to provide the signal. The hub 213 is rotatably carried by the housing 211 on ball bearings 214 and 216. Shoulders 217 and 218 on the hub 213 prevent axial shifting of the hub 213 and the wheel 212 relative to the housing 211. The entire assembly, however, is axially shiftable on the axle 107, and a pin 219, similar to the pin 150, is provided for effecting such shifting.

The principal difference between the instant signal generating device and that shown in FIGS. 6 and 7 is in the armature 215 and the cooperating pick-up means that provide the signal. The armature 215 is a circular drum having a surface 221 upon which a magnetic recording can be made. The cooperating pick-up means is a conventional recording playback head 220 similar to those employed in magnetic tape recorders, and is mounted in a bore 222 provided at a corner of the housing 211. The head 220 is held in operative relation to the surface 221 by a spring 223 backed by a cap 224 secured by a screw 226. A set of leads 227 carries signals to and from the head 220.

This form of signal generating device is prepared for operation by recording with the head 220 a predetermined fixed frequency signal, preferably a sine wave signal, on the drum 221 as the drum is rotated at a predetermined constant speed. Thereafter, as the drum or armature 215 is rotated by the wheel 212, the play-back element in the head 220 repeatedly reproduces the previously recorded signal. From the foregoing it is apparent that the frequency of the reproduced signal is determined by the rotative speed of the disk 212 and, hence, the drum 215, just as in the case of the signal generator shown in FIGS. 6 and 7.

*The Recorder-Transducer Means Combination*

It was previously mentioned that the recorder and the transducer means are interconnected to avoid errors that might otherwise occur due to variations in memory path velocity. To illustrate the problem more clearly, what occurs when an alternating current signal of fixed frequency is recorded on a moving memory path should be considered. If the memory path moves at constant velocity, time is reflected in the memory path as a distance and hence the signal recorded will be reflected on a magnetic memory path as a series of magnetic impressions having equal recorded wave lengths. If the velocity of the memory path increases during recording, the recorded wave length of the magnetic impressions increases and, conversely, if the velocity decreases, the recorded wave length decreases. Upon playback, if the memory path passes the play-back head at a velocity different from that at which it passed the recording head, the frequency of the reproduced signal will be different from that of the signal recorded. The same reasoning applies to the recording and playback functions in the system. Therefore, since frequency is the controlling characteristic of the signals in the instant systems, a false response in the subject structure must ordinarily be expected unless memory path velocity on play-back is the same as it was during recording or the problem otherwise solved. This problem becomes acute in portable devices that must be operated from a portable power source where exact regulation is difficult and costly.

In conventional magnetic tape recorders, for example, synchronous capstan motors are used to maintain constant tape velocity. In a portable device such motors, if used, would probably be driven by a portable 60 cycle alternating current source and a 5% variation in line frequency from conventional portable power sources would be expected. As pointed out before, some of the standard telemetering bands have a width of 15% that represents, in the instant systems, the full variation of its assigned variable quality. A variation of 5% in the line frequency would cause a 5% change in the recorded wave length. Such 5% change in wave length would result in a 33% error upon reproducing the signal at standard velocity. Such error would, of course, be intolerable.

The present invention provides a unique and highly satisfactory solution to the problem of varying memory path velocity. Basically, the solution of the problem is accomplished by proportionately varying the frequencies of the signals from the transducer means in accordance with the variation of memory path velocity, while the frequency of each is being independently varied in accordance with the variations of its respective quality. In other words, the frequency of a signal from the transducer means is made both a function of its respective quality and a function of memory path velocity. This relationship is conveniently accomplished by using the transducer means shown in FIGS. 2, 3, 4 and 5 and driving the friction disk 102 in synchronism with the memory path or tape transport mechanism.

While one way of driving the friction disk and the tape transport substantially in synchronism would be to drive them by a pair of synchronous alternating current motors interconnected by a common power line, FIGS. 2 and 3 show a more reliable mode of effecting the same result, since momentary lag of one element behind the other due to inertia cannot occur.

Referring again to FIGS. 2 and 3, in addition to the pilot engine 11, the transducer 101, and the motor 103, previously described, the record producing portion of the system in FIG. 2 also includes the amplifier means 13 connected to coil 113 by leads 34, and the recorder 14 having a recording head 234. The recording head 234 is coupled to the amplifier by leads 39 to receive the amplified signal for recording on a memory path.

The recorder 14 is a conventional magnetic recorder in which a magnetic tape, fragmentarily shown at 237, is moved from the usual storage reel to a take-up reel by a transport mechanism. As the tape moves from the storage reel to the take-up reel, it passes the head 234 and the signal is magnetically impressed on it. The transport mechanism comprises, in this instance, a pinch roller 238 and an opposing tape drive roller 239.

To insure that the recorded wave length of the magnetic impressions on the tape are unaffected by changes in tape velocity, the tape drive roller 239 and the disk 102 are driven in synchronism. To this end, the drive shaft 105 is also connected to the drive roller 239.

It can be shown by mathematical analysis that in a system having the above described interconnection between the transducer and the tape transport, the wave length of recorded impressions are unaffected by variations in memory path velocity. The following equations clearly demonstrate that result:

$$V = K_1 f_L$$

$$f_r = K_2 f_L \frac{r2n}{d}$$

$$W = \frac{V}{f_r} = \frac{K_1 f_L}{K_2 f_L \frac{r2n}{d}} = \frac{K_1 d}{K_2 r 2n}, \text{ which is a constant independent of } V$$

where:

$r$ = the instantaneous distance between the wheel 108 and the rotative center of the disk 102;
$d$ = the diameter of the wheel 108;
$n$ = the number of teeth 112 on the disk 111;
$V$ = the instantaneous velocity of the tape 237;
$W$ = the recorded wave length;
$K_1$ and $K_2$ are constants;
$f_L$ = the line frequency;
$f_r$ = the frequency of the signal produced by the transducer 101.

FIG. 2 also shows the pilot engine 11 provided with the speed responsive transducer 16 shown in FIGS. 1, 10 and 11 and described in detail above. It should be noted that in this instance there is no interconnection between the transducer 16 and the tape drive roller 239 and hence the corrective feature above described is not provided in connection with the measurement of engine speed. Of course, if accurate control of speed were sufficiently important, the corrective measures outlined above could be provided by using the signal generating device 136. However, the speed has an assigned frequency range of 200 to 2000 cycles per second, or a spread of about 80% on either side of the middle frequency. Therefore a 5% shift in line frequency would produce about a 5% error on playback.

In FIG. 2, the signal output of the transducer 16 is amplified by the amplifier means 13, combined with the signal from transducer 101 and recorded as a composite signal as heretofore discussed.

It is also advisable to correct for variable memory path velocity in the playback and engine control portion of the system. Variable memory path velocity causes a similar, but slightly different problem, involving the recorded wave length of the signals, in this portion of the system. Here reproductions of the recorded signals and the condition indicating signals are compared and operation of the subject engine 46 is changed to eliminate any difference therebetween. If the memory path has a velocity on playback different from its velocity during recording, the frequency of the reproduced signal will be different from that of the signal recorded and error would be expected to result. This latter problem is not generally as acute on playback, however, because playback usually occurs in the laboratory, and line frequency for operating the tape transport mechanism in this environment is much more stable and may be more readily controlled in the laboratory than in the portable device. However, to insure faithful control of the engine 46, the transducer means and the tape transport mechanism are interconnected as before. The interconnection provided by the shaft 105a in FIG. 3 relates the frequency of corresponding signal from the transducer 101a so that the effect of variation of tape velocity is eliminated, and this effect can also be demonstrated mathematically by using reasoning similar to that used above.

It should be recognized, in connection with both portions of the system, that the interconnection described above will not correct for operating time differences that may result from differences in tape velocity. Inasmuch as line frequency fluctuations are transient in character, in the main, such fluctuations will tend to cancel out, and operating time will not be unduly affected. Moreover, any mean variation from standard line frequency will not result in a magnified error in operating time. Therefore, for most uses, this source of error may be ignored, but if operating time is critical measures can be taken to insure more exact time control. However, even if there is some slight error in actual operating time, the sequence of changes, the magnitude of such changes, and to a great extent the relative operating times are accurately reproduced.

Many of the remaining elements of the portion of the system shown in FIG. 3 are the same or are identically similar to those elements found in the portion of the system shown in FIG. 2 and for this reason have been given the same reference numerals with "$a$" subscripts. In FIG. 3, the recorder 14a has a play-back head 248 that is connected by leads 78 to the frequency comparator means 64. Also, the coil 113a of the transducer 101a is connected to the frequency comparator means 64 by leads 79. The comparator means 64 compares the frequencies of the signals from the playback head 249 and the transducer 101a and provides an output signal that is representative of the difference therebetween, if any, and the output signal is fed to the servo-motor 96 by leads 98. The servo-motor 96 is reversible and rotates in one direction or the other depending on which of the signal frequencies is the higher. If the frequencies are the same, the motor 96 will not rotate. This action will be explained in more detail later. The servo-motor 96 is connected to the valve 94 by the mechanism 97 and thereby actuates the control device to eliminate the frequency difference, if any.

Thus, from the foregoing it must be apparent that the mode of relating the frequency of a signal from the transducer means to the velocity of a memory path, shown in FIGS. 2 and 3, conveniently and inexpensively avoid errors due to variation in memory path velocity.

*The Frequency Comparator–Servo-Motor Combination*

Another important aspect of this invention involves the portion of the system that controls the subject engine by the differences between the reproduced signals and their corresponding condition indicating signals. In the system described herein this is accomplished by a set of unique frequency comparator devices, the output of each of which is connected to a field winding of an associated conventional two-phase reversible servo-motor.

FIG. 12 shows in block form the major circuit components of one form of the frequency comparator device used in the instant system. Adjacent the various circuit components are graphical representations of the output signals that illustrate the sequential changes effected by the components. Each graphical representation is connected by a dash line to the output side of the particular element that provides the change.

The comparator device illustrated in FIG. 12 is one of a set of such devices that make up the comparator means 64 in FIG. 1. With the instant device, a pair of input terminals 257 and 258 are respectively connectable to two sources of frequency modulated signals. The terminal 257, in this instance, is coupled or connected to the output of the playback head 248 shown in FIG. 3, and also to the band pass filter 48 by the lead 56. The band pass filter 48, of course, passes only that component of the composite signal that has a frequency within the predetermined frequency range assigned to manifold air pressure. The terminal 258 is coupled to the output of the transducer 17a, providing the corresponding condition indicating signal.

The incoming signals are each amplified to an optimum magnitude. Thus, an amplifier 262 is connected by a lead 263 to the band pass filter 48 and the amplifier device 27a is connected to the terminal 258 by the lead 32a. The band pass filter 259 and the amplifiers 262 and 27a are not, strictly speaking, parts of the comparator device, but are included in FIG. 12 to show how the comparator device is connected in the system shown in FIG. 1.

Broadly speaking, the comparator device per se compares the instantaneous frequencies of two incoming signals in a single, frequency-measuring circuit and delivers a phase sensitive signal varying in amplitude that is in synchronism with the frequency of an alternating current power line. For example, if the power line carries a sixty-cycle current, the output signal of the comparator device will be sixty-cycle. The frequency measuring circuit measures the instantaneous frequency of a signal fed to it by providing a direct current signal the magnitude of which is substantially proportional to the frequency. The signal measured by the circuit is alternately first one incoming signal and then the other, and is shifted in synchronism with line frequency. Therefore, if a frequency difference exists between the incoming signals, the direct current output of the circuit will have an alternating current component impressed thereon as a result of the difference in magnitude between adjacent portions of the direct current output signal. The alternating current component will, of course, have line frequency and its phase will indicate which of the incoming signals has the higher frequency. Moreover, the alternating current component is ideally suited, when amplified, for operating the two-phase servo-motors. A very important advantage of this single frequency measuring circuit comparator over conventional bridge type comparators lies in the fact that aging or ambient changes will not harmfully affect the output since such changes are applied to both incoming signals equally. Moreover, the necessity of careful adjustment of two networks, as in a conventional bridge, is unnecessary.

More specifically, the comparator device per se comprises a frequency measuring circuit and a synchronous switch or chopper 267. The synchronous switch 267 is connected to the amplifiers 262 and 27a by leads 268 and 269, respectively. For illustrative purposes, the signals carried by the leads 268 and 269 are graphically shown at 272 and 273, respectively, the frequency of the signal 272 being shown as higher than the frequency of signal 273, and the length of the graph representing the time interval of one cycle at power line frequency, indicated as $t$ in the drawing.

The switch 267 may be an electronic switch, but is shown in FIG. 12 as an electro-mechanical chopper having a switch actuating coil 271 connectable to an alternating current power line (not shown). The switch 267 is actuated by the coil 271 to alternately connect the leads 268 and 269 to the frequency measuring circuit in synchronism with power line frequency as a consequence of the reversal of polarity of line current. The interval during which switching occurs is as short as possible, since it is desired that the signal from the switch 267, consisting of alternate samples of the two incoming signals, be as near continuous as possible. The signal from the switch 267 is made up of alternate portions of the signals 272 and 273, as shown at 274.

The signal 274 is conducted by a lead 276 from the synchronous switch 267 to the frequency measuring circuit of the device. The frequency measuring circuit comprises a limiting means or clipper 277, a power amplifier 278, differentiator-rectifier means 279, and low pass filter means 281.

The limiting means or clipper 277 is connected to the lead 276. The clipper 277 is a conventional limiting device that limits the amplitude of the signal to provide a constant amplitude output, such as the more or less square wave signal graphically shown at 282. The alternate components of the signal 282 have, however, the same fundamental frequencies as the components of signal 274. The clipper 277 is connected by a lead 283 to the power amplifier 278, which is a conventional device.

Following the amplifier 278, the next section of the comparator device is pulse forming and rectifying means, denoted as differentiator-rectifier 279 in FIG. 12. This part of the circuit operates to form a rectified pulsating signal such as is shown graphically at 286. In effect, this section can be thought of as one which differentiates the incoming signal with respect to time, the pulses being substantially equal to each other and each representing one cycle of the signal. Thus, the first half of the signal 286 is a series of equal pulses corresponding in number to the frequency of the signal 272 in cycles per second times the time interval $t/2$ and the last half of the signal 286 continues with a series of pulses equal to those in the first half and to each other, but the frequency changes midway in the interval $t$ and the pulses in the second half correspond in number to the frequency of the signal 273 times the time interval $t/2$.

The final stage or section of the comparator is the low pass filter means 281. The signal 286 is conducted to the low pass filter means 281 from the differentiator-rectifier 279 by the lead 287. The filter means 281 is such that it will pass signals having a frequency in the neighborhood of line frequency, which in this instance is sixty cycles per second, but will not pass substantially higher frequencies such as the pulses in the signal 286. However, the low pass filter 281, in effect, integrates the pulses in the signal 286, forming the pulsating direct current signal shown at 288. Since it was assumed in the beginning of this description that the incoming signal 272 has a higher frequency than the signal 273, the first half of the direct current signal 288 will have a magnitude greater than the last half, as shown. Thus, because of the difference in magnitude, the direct current signal 288 has an alternating current component impressed on it when there is a frequency difference between the two incoming signals, and when no frequency difference exists there is no alternating current component of line frequency. The amplitude of such alternating current component is thus representative of the frequency difference between the incoming signals. Moreover, because of the action of the chopper, the frequency of the alternating current component will be the same as the frequency of the power line that actuates the chopper or synchronous switch 267.

One additional and very significant characteristic of the alternating current component of the signal 288 is the relationship between its phase and that of the power line that actuates the synchronous switch 267. When the frequency of one of the incoming signals, such as 272, is higher than the other, such as 273, the alternating current component will be substantially in phase with the line. When the frequency of the one signal is lower than the other, the alternating current component will be substantially 180° out of phase with the line. Thus, the phase of the alternating current component clearly indicates which of the two frequencies is higher. Only minor adjustments, if any, are required to make the component exactly in phase, or exactly 180° out of phase, as the case may be, with respect to the line. The alternating current component is ideally suited for use in conventional two-phase servo-motors, but of course, the output signal 288 could also be used for other purposes, such as operating meters and the like.

The final portion of the circuit shown in FIG. 12 is a voltage amplifier and control device 289. The device 289 is connected by a lead 291 to the output of the low pass filter 281. The device 289 includes conventional elements arranged to amplify, filter and shift the phase of the output and, thus, provide an alternating current for use by a two-phase servo-motor, such as will be discussed more fully hereinafter. The output of the device 289 is connected to an output terminal 292 by the lead 83.

FIG. 13 shows, in two segments, one below the other, the circuit of one channel of the control portion of a system, from play-back device 14a and transducer 17a to the servo-motor 87 and the subject engine 46. A somewhat different form of frequency comparator device is schematically shown in detail in the circuit. Broadly speaking, the instant form of comparator device is the same as that previously described except that synchronous switching is accomplished electronically. The circuit elements and stages shown are conventional and will, therefore, be easily understood by those skilled in the art. Therefore a detailed description of each element is not deemed necessary. It should be clearly understood, however, that the circuit shown is illustrative of only one channel and that additional qualities are controlled by similar channels in the system.

The channel shown in FIG. 13 has been assigned, by way of example, the function of controlling manifold air pressure of the subject engine 46. The transducer device 17a, for providing a frequency modulated signal representative of manifold air pressure, is attached to the engine 46. Its pickup device 151 is connected to signal amplifying means shown as enclosed in the block 27a (see FIGS. 1 and 13) to provide the feedback condition indication signal.

The engine speed is controlled in part by a signal which, of course, comes from a previously prepared record that is reproduced in the play-back means 14a. The output of the playback means 14a is connected to other signal amplifying means enclosed in the block 302 associated with the band pass filter 49. Included in the amplifying means 302 is the filter 49 for passing only that component of the signal from the playback means 14a that relates to manifold air pressure.

As mentioned above, synchronous switching to alternately pass portions of the condition indicating feedback signal and the reproduced signal is electronically accomplished in this form of the device. To this end, the comparator circuit is provided with an alternating current signal generator in the form of a multivibrator shown enclosed in the block 304. The multivibrator 304 is connectable to an alternating current power line, in this case a sixty-cycle line, through terminals 306, and operates in synchronism therewith. The output of the multivibrator controls a pair of drivers, tubes 307 and 308. The drivers 307 and 308 are connected to tubes 309 and 311, respectively, which are a pair of switchers, so that the cathode of first one and then the other of the switchers is driven positive relative to its plate in synchronism with the multivibrator 304, and hence with the line. The grids of the switchers 309 and 311 are connected to the outputs of the amplifiers 27a and 302, respectively. Thus, when the switchers are conducting, their outputs are modulated by the output signals from their associated amplifiers. Of course, the switchers conduct only when their cathodes are negative relative to their plates and are cut off when made positive by the drivers 307 and 308. Thus, the multivibrator 304, the drivers 307 and 308 and the switchers 309 and 311 form an electronic synchronous switch for alternately passing segments of the two input signals of the amplifiers 27a and 302. This switch is more efficient for many purposes than the electro-mechanical chopper 267 described in connection with FIG. 12 because there is practically no lag in switching from one signal to the other in the electronic device.

The plate output signals of the switchers 309 and 311 join at a junction 312 and at this point correspond to the signal 274 in FIG. 12. Following the electronic synchronous switch is a wave shaping, limiting or clipping device, which in the present instance is a conventional mono-stable multivibrator shown as enclosed in the block 313. The multivibrator 313 is caused to flip from one stable condition to an opposite stable condition each time the incoming signal from the synchronous switch passes through the zero voltage point. This results in a substantially square wave constant amplitude output signal of the same fundamental frequency as the signals from the switchers 309 and 312. The output from the clipping section in block 313 thus corresponds to the signal 282 in FIG. 12.

Following the block 313 is a pentode tube 314 which is connected to the output of the multivibrator 313. This tube serves merely to isolate the multivibrator from the remainder of the circuit.

Next in order in the circuit, following the tube 314, is a pulse forming and rectifying device shown as enclosed in the block 316. A capacitor 317 in the device is connected by the lead 315 to the cathode of the pentode 314. The pulse forming device 316 can be considered one which differentiates with respect to time, and its output signal corresponds to the signal 286 in FIG. 12.

The frequency measuring section of the channel is completed by a low pass filter device, shown in block 318, and connected to the output of the pulse forming and rectifying device 316. A tube 318a in this portion of the circuit also provides some amplification. The output of the device 318 corresponds to the signal 288 in FIG. 12.

The remainder of the electronic circuit shown in FIG. 13 is conventional compensating and servo-amplifying means, the output of which is connected to one field winding 319 of the servo-motor 87. The servo-motor 87 has a second field winding 322 connectable by terminals 323 to the same power line that is connected to the terminals 306.

In accordance with the preceding description, it will be apparent that the line frequency alternating current component in the winding 319 will be substantially in phase with the line current in the winding 322 when the frequency of the reproduced signal is higher than frequency of the condition indication signal, substantially 180° out of phase with the line current when the frequency of the reproduced signal is lower than the condition indicating signal, and that there will be no line frequency alternating current in the winding 319 when the signal frequencies are the same. When the alternating current components in the motor windings 319 and 322 are substantially in phase, the rotor 324 of the motor is driven in one direction and when they are substantially 180° out of phase, the rotor is driven in the opposite direction. If there is no line frequency alternating current in the winding 319, the rotor is stationary.

The rotor 324 is connected by the mechanism 88 to the throttle lever 86 on the engine 46 so that rotation of the motor in one direction opens the throttle and increases the manifold air pressure, and rotation in the opposite direction closes the throttle and decreases the manifold pressure. Thus, if the frequency of the reproduced signal is higher than the frequency of the condition indicating signal, the manifold air pressure is lower than it should be. The frequency comparator device instantly indicates this fact by providing an output signal that is substantially in phase with the power line frequency. These two signals actuate the servo-motor to rotate in the one direction, thereby opening the throttle somewhat until the manifold air pressure has increased sufficiently to eliminate the frequency difference between the reproduced signal and the condition indicating signal. When the difference has been eliminated, there will be no alternating current output from the comparator device and the servo-motor will stop. Likewise, if the manifold air pressure is high, the frequency of the reproduced signal will be lower than that of the condition indicating signal, and the signal from the frequency comparator will cause the servo-motor to rotate in the opposite direction, and thus close the throttle somewhat. Control of other variable qualities in a test engine are accomplished in substantially the same fashion by other channels similar to that shown in FIG. 13.

*Modifications of the System*

Figure 16:
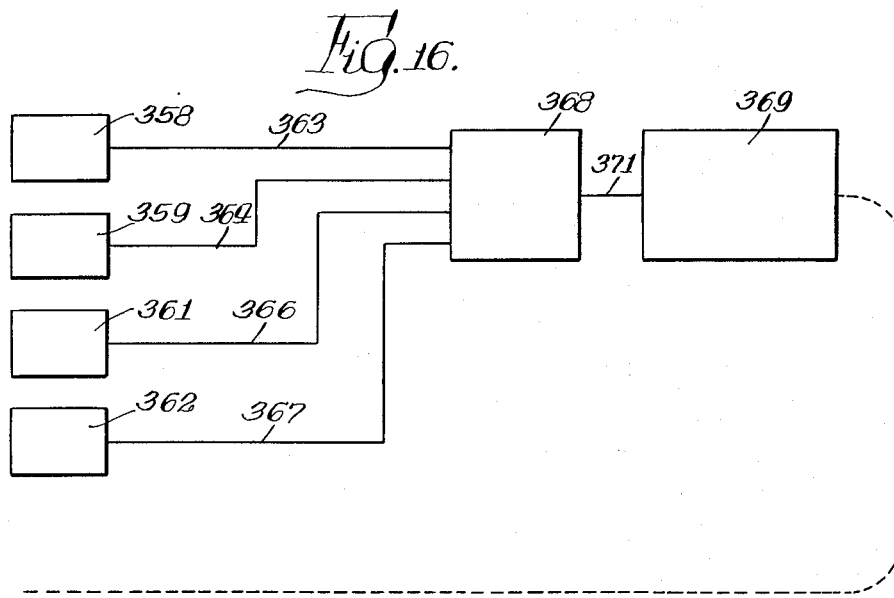
FIG. 16 is a block diagram of the recording portion of yet another modified system for simulated road testing of an engine.

It will be apparent that the various features of this invention which have been described in detail above lend themselves to many different types of programming systems. FIGS. 14, 15 and 16 show variations of the basic system shown in FIG. 1, which may be used for engine testing.

The system in FIG. 14 illustrates that the present invention is adapted to record and control variable qualities that are independent of the conditions existing in the engine as well as qualities that are dependent on engine conditions. This system is broadly the same as that shown in FIG. 1 in that it records a set of signals representative of variable qualities of a pilot engine 327 as they vary under operational conditions and uses the record to control a subject engine 327a. The system includes transducer means 328 and 328a that are connected to the engines, a recording means 329, playback means 330, band pass filters such as 331, and frequency comparator means 332. Many of the leads interconnecting the various elements are not shown, but they are identical to their counterparts shown in FIG. 1.

The system shown in FIG. 14 differs from the system shown in FIG. 1 in that it controls the position of the throttle of the subject engine 327a by a record of throttle position in the pilot engine 327. Throttle position is, of course, a variable quality that is independent of the conditions existing in the engine. A conventional variable frequency oscillator 333 is connected to linkage mechanism 334 between an accelerator lever 336 and the throttle 337 of the pilot engine 327. As the lever 336 is moved to change the throttle position, the oscillator 333 is changed accordingly and the frequency of its output signal varied. The outptu signal of the oscillator 333 is connected to the recorder 329 by a lead 338, its signal being combined with the signals from the transducer means 328 to form a composite signal, as previously described.

The playback portion of the system differs from the system shown in FIG. 1 in the same way. A variable frequency oscillator 333a is connected to linkage mechanism 334a between an accelerator lever 336a and the throttle 337a of the subject engine 327a, just as in the case of its counterpart in the recording portion of the system. The output signal of the oscillator 333a is, of course, a feedback or condition indicating signal and is compared with the corresponding reproduced signal from the playback means 330 and the band pass filter 331 in the frequency comparator means 332. The output of the comparator means actuates a servo-motor 339 to properly position the accelerator 336a in response to the difference between the compared signals, as previously described. Other qualities are, of course, controlled by the system at the same time and in the same way as in FIG. 1.

It is often desirable to provide a purely arbitrary program of operation for the subject structure, not based on field or road test operation of a pilot structure. FIGS. 15 and 16 show two systems for preparing programming recordings in the laboratory, which programs may simulate road or field tests, if desired. In both illustrations only the record producing portions of the systems are shown, because the playback portions are the same as shown in FIG. 1.

The system shown in FIG. 15 is the more elaborate of the two because a pilot engine 341 is used in preparing the record as a check to insure that the signals recorded will properly control a subject engine. As in the previously described systems, the piolt engine 341 is provided with transducer means 342 for sensing the presence and extent of the various selected variable qualities to be controlled and for providing a frequency modulated signal representative of each. In addition, the engine 341 is provided with means, including meters, one of which is shown at 343, for providing visual indication of the variation of each of the selected qualities in the pilot engine 341.

Unlike the preceding systems, however, the signals from the transducer means are not recorded, but instead are used in the same manner as the condition indicating signals in the control portion of the systems previously described; that is, they are used for comparison purposes. Each signal from the transducer means 342 is conducted to an associated frequency comparator device, and is there compared with a signal that is recorded, as hereinafter described. The comparator device 344 is connected to an element of the transducer means 342 by a lead 346. Other leads 345 connect the transducer means 342 to other comparator devices (not shown).

The signals that are recorded for controlling a subject engine originate in manually variable oscillators, one of which is shown at 347. The oscillator 347 has an adjusted frequency range that is the same as that of the portion of the transducer means 342 connected to the comparator device 344, and this frequency of the oscillator 347 is manually varied by an operator. The output signal of the oscillator 347 is conducted to the comparator device 344 by a lead 349 and is also conducted to amplifier means 351 by a lead 352. Leads 353 from other oscillators (not shown) are also connected to the amplifier means 351. The output of the amplifier means 351 is a composite signal of the type previously described and is carried by a lead 356 to a recorder 354 where it is recorded.

The signal from the oscillator 347 and the corresponding signal from the transducer 342 are compared by the comparator device 344 and the output signal of the latter actuates a servo-motor 357, which, in turn, controls engine operation, as in the playback portions of the system shown in FIG. 1.

In preparing a record for programming the operation of a subject engine using the above apparatus, the pilot engine 341 is started, the operator observes the meter included in means 343 and he manually varies the output of the oscillator 347 as needed to cause the pilot engine to respond and produce a desired variation in the quality. The output signal of the oscillator 347 and the corresponding signal from transducer means 342 are compared by the comparator device 344. The output of the comparator device 344 caused by a frequency difference between the signals actuates the servo-motor 357, and thereby effects the response in the engine that eliminates the difference, as in the playback portion of the system shown in FIG. 1. At the same time the signal from the oscillator 347 is combined with signals from other oscillators and the combined signal is recorded.

In many situations a satisfactory arbitrary record can be produced in the laboratory in a more direct manner. The system shown in FIG. 16, for example, uses no pilot structure, and produces a purely arbitrary record for controlling a subject structure. This system presupposes knowledge on the part of the persons preparing the record of the exact frequency response of transducer means that will be used in playback.

This system includes one or more manually variable oscillators, such as 358, 359, 361, and 362. Each oscillator is adjusted to provide signals within the distinctive bands that correspond to the output signals of the transducer means to be used in playback. The oscillators 358, 359, 361, and 362 are connected by leads 363, 364, 366, and 367, respectively, to amplifier means 368. The output of the amplifier means is a composite signal of the type previously discussed and is carried to a recorder 369 by a lead 371.

A programming record is prepared by recording for a desired period the composite signal provided by the oscillators 358, 359, 361, and 362. During recording the oscillators are individually manually varied in measured amounts corresponding to the amount of variation desired in the operation of the subject engine or other structure.

*Summary*

From the foregoing it is apparent that the instant invention provides a novel mode of programming the operation of subject structures by a reproducing record and is particularly well adapted for simulating field or road tests in the laboratory. The program controlling record is such that the program of operation may be repeated as often as desired. The apparatus for practicing this invention includes novel electro-mechanical transducer means which, when coupled to the recorder as disclosed herein, eliminates one substantial source of error growing out of variation of memory path velocity during recording and during playback. The apparatus also includes novel frequency comparator means, the output of which is utilized to actuate conventional servo-motors and thereby control a subject structure by the frequency differences between sets of two signals. The systems disclosed are adapted to handle any desired number of infinitely variable qualities.

Although the invention has been described in connection with certain specific structural embodiments and applications, it is apparent that modifications and alternative structure may be resorted to without departing from the scope of the invention as defined in the appended claims wherein.

I claim:

1. Apparatus for controlling in a subject structure a measurable quality in a predetermined manner, comprising a device for producing and frequency modulating an electrical signal having a range of frequencies representative of the range of variation of said quality, means coupled to said device for recording said signal to provide a reproducing record of said signal, means for reproducing said signal from said record, transducer means adapted to sense the presence and extent of said quality in said structure and for producing a frequency modulated condition indicating signal in accordance therewith, said transducer means and said device being adjusted to the same frequency range with respect to each other, frequency comparator means coupled with said transducer means and said reproducing means for comparing the frequency of said reproduced signal with that of said condition indicating signal, said comparator mens beng operble to sample sad reproduced signal and said condition indicating signal alternately at a predetermined frequency, and means coupled with said comparator means and responsive to the dierence between said compared signals for controlling said subject structure to eliminate said difference.

2. Apparatus according to claim 1 in which said recording means and said reproducing means are respectively the recording and playback components of a magnetic recorder.

3. Apparatus according to claim 1 in which said device comprises a manually controlled variable frequency oscillator adjusted to oscillate within a predetermined frequency band.

4. Apparatus for controlling in a subject structure one or more measurable qualities in a predetermined manner, comprising means for providing a frequency modulated electrical signal for each quality, each electrical signal having a distinctive band of frequencies representative of the range of variation of its quality, means coupled with said signal providing means for recording said one or more signals to provide a reproducing record thereof, means for reproducing said one or more signals from said record, transducer means adapted to sense the presence and extent of said one or more qualities at said structure and operable to provide a frequency modulated condition indicating signal for each quality, each condition indicating signal having a frequency varying with the variation of said quality in said structure within the distinctive band representative of said quality, a frequency comparator device for each frequency band, each comparator device being coupled with said reproducing means and said transducer means to compare the reproduced signal and the corresponding condition indicating signal, each of said comparator devices including means operable to sample the associated reproduced signal and the corresponding condition indicating signal alternately at a predetermined frequency, and an individual controller coupled to each of said comparator devices and operable in response to the frequency difference between said signals to control said structure to eliminate said difference.

5. Apparatus for reproducing in a subject structure a set of measurable qualities of a pilot structure varying under operational conditions, comprising transducer means for sensing the presence and extent of each of said qualities in the pilot structure as said qualities vary under operational conditions and for producing a distinctive frequency modulated alternating current signal corresponding to each of said qualities, a movable memory path, drive means for moving said memory path, recording means coupled with said transducer means for recording said signals on said memory path to provide a reproducing record thereof, means interconnecting said drive means and naid transducer means during recording thereby relating the frequencies of said signals to the velocity of said memory path, playback means for reproducing said signals from said memory path, and means for controlling said subject structure in response to said reproduced signals to subject said subject structure to the variations of said qualities under said operational conditions.

6. Apparatus for reproducing in a subject structure a set of measurable qualities in a pilot structure varying under operational conditions, comprising first transducer means for sensing the presence and extent of each of said qualities in the pilot structure as said qualities vary under operational conditions and for producing a distinctive frequency modulated alternating current signal corresponding to each of said qualities, a movable memory path, drive means for moving said memory path, recording means coupled with said transducer means for recording said signals on said memory path to provide a reproducing record thereof, means interconnecting said drive means and said transducer means during recording for relating the frequencies of said signals to the velocity of said memory path, playback means for reproducing said signals from said memory path with the latter driven by said drive means, second transducer means for sensing the presence and extent of each of said qualities in the subject structure as said qualities vary and for producing a distinctive frequency modulated alternating current condition indicating signal corresponding to each of said qualities, said first and second transducer means being adjusted with respect to each other so that their frequency responses to equal qualities are the same, means interconnecting said drive means and said second transducer means during playback for relating the frequencies of said condition indicating signals to the velocity of said memory path, and means for controlling said subject structure in response to differences between said reproduced signals and the respective condition indicating signals to eliminate such differences.

7. Apparatus for reproducing in a subject structure a measurable quality in a pilot structure varying under operational conditions, comprising transducer means adapted to be selectively connected to said pilot structure and said subject structure for sensing the presence and extent of said quality in the connected structure as said quality varies under operational conditions and for producing a frequency modulated alternating current signal corresponding to said quality, a movable memory path, drive means for moving said memory path, means interconnecting said drive means and said transducer means thereby relating the frequency of the signal to the velocity of said memory path, recording means coupled with said transducer means when the latter is connected to said pilot structure for recording the pilot structure signal on said memory path, playback means for reproducing said signal from said memory path, and means coupled to said playback means and to said transducer means when the latter is connected to said subject structure to provide a condition indicating signal for controlling said subject structure in response to the difference between said reproduced signal and such condition indicating signal to eliminate such difference.

8. Apparatus for reproducing in a subject structure a set of measurable qualities in a pilot structure varying under operational conditions, comprising transducer means adapted to be selectively connected to said pilot structure and to said subject structure for sensing the presence and extent of each of said qualities in the connected structure as said qualities vary under operational conditions and for producing a distinctive frequency modulated alternating current signal corresponding to each of said qualities, a movable memory path, drive means for moving said memory path, means interconnecting said drive means and said transducer means for relating the frequencies of said signals to each other and to the velocity of said memory path, recording means coupled with said transducer means when the latter is connected to said pilot structure for recording the pilot structure signals on said memory path, playback means for reproducing said signals from said memory path, and means coupled to said playback means and to said transducer means when the latter is connected to said subject structure to provide condition indicating signals for controlling said subject structure in response to the differences between said reproduced signals and corresponding condition indicating signals to eliminate such differences.

9. Apparatus for reproducing in a subject engine a measurable quality in a pilot engine varying under operational conditions, comprising first transducer means adapted to be connected to said pilot engine for sensing the presence and extent of said quality therein as the same varies under operational conditions and for producing a frequency modulated alternating current signal corresponding to said quality, means for recording said signal to provide a reproducing record thereof, playback means for reproducing said signal from said record, second transducer means adapted to be connected to said subject engine for sensing the presence and extent of said quality therein as said quality varies and for producing a frequency modulated alternating current condition indicating signal corresponding to said quality, control means for comparing said reproduced signal and said condition indicating signal and operable in response to a difference between the frequencies of said reproduced signal and said condition indicating signal for controlling said subject engine to eliminate said difference.

10. Apparatus for reproducing in a subject structure a measurable quality of a pilot structure varying under operational conditions, comprising transducer means for sensing the presence and extent of said quality in said pilot structure as said quality varies under operational conditions and for producing a first frequency modulated electrical signal corresponding to said quality, means for providing a visual indication of the extent of said quality, manually controlled variable frequency oscillator means for providing a second frequency modulated signal, frequency comparator means coupled with said transducer and said oscillator means to provide a signal representative of the difference between said first and second signals, means coupled with said comparator means and operable in response to said representative signal to change the quality in said structure to eliminate said difference, recorder means coupled with said oscillator means to provide a reproducing record of said second frequency modulated signal, and means for controlling said subject structure by said record to subject said subject structure to the variations of said quality under said operational condition.

11. In combination, transducer means adapted to sense the presence and extent of a measurable variable quality and operable to provide a frequency modulated alternating current signal varying according to the variation of said quality, a recorder comprising a movable memory path, drive means for moving said memory path, and a recording head coupled with said transducer means for recording said signal on said memory path, and means responsive to said drive means for further varying during recording the frequency of the signal generated in accordance with variation in the velocity of said memory path to eliminate the effect of variations of said velocity.

12. In combination, transducer means comprising an alternating current signal generator having a rotatable armature, a variable speed drive connected for rotating said armature, and means adapted to sense the presence and extent of a quality and operable in response to variations of that quality to vary the speed of said drive in accordance with the variation of said quality and thus modulate the frequency of the signal, a recorder comprising a movable memory path, a recording head coupled with said generator for recording said signal on said memory path, and a drive for said memory path, said drives being interconnected to eliminate the effect of variations in the velocity of said memory path.

13. The combination according to claim 12 in which said drives are driven by a single motor.

14. In combination, a transducer device comprising a housing, a first rotatable member rotatably journalled in said housing and having a radially extending surface concentric with the axis of rotation thereof, a second rotatable member carried by said housing and having a peripheral surface in frictional engagement with said radially extending surface, said second rotatable member being shiftable radially relative to said first member while in frictional engagement therewith to effect a change in their relative rotative speeds, an alternating current generator having a rotatable armature connected to said second rotatable member, means adapted to sense the presence and extent of a quality and operable in response to variations of that quality to shift said second rotatable member radially relative to said first rotatable member an amount corresponding to the variation of said quality, a recording device comprising a moving memory path, a recording head coupled with said generator for recording said signal on said memory path, and a rotatable drive for moving said memory path, and driving means connected to said rotatable drive and to said first rotatable member for rotating them substantially in unison to eliminate the effect of variations of the velocity of said memory path.

15. The combination according to claim 14 in which said drive means comprises a shaft connecting said rotatable drive and said first rotatable member, and an electric motor connected to rotate said shaft.

16. In combination, a transducer device comprising a housing, a first rotatable member rotatably journalled in said housing and having a radially extending surface concentric with the axis of rotation thereof, a plurality of secondary rotatable members carried by said housing in circumferentially spaced relation about said first rotatable member, each of said secondary members having a peripheral surface in frictional engagement with said radially extending surface and each of said secondary members being independently shiftable radially relative to said first member while in frictional engagement with the surface thereof to effect a change in the relative rotative speed therebetween, an individual alternating current generator for each of said secondary members, each generator having a rotatable armature connected to its associated secondary member for rotation in unison therewith, an individual quality sensing mechanism for each generator, each sensing mechanism being adapted to sense the presence and extent of an individual preassigned quality and operable to shift the secondary rotatable member of its associated generator radially relative to said first rotatable member an amount corresponding to the variations of its said quality, a recording device comprising a moving memory path, recording head means coupled to said generators for recording the signals generated thereby on said memory path, and a rotatable drive for moving said memory path, and driving means connected to said rotatable drive and to said first rotatable member for rotating them substantially in unison to eliminate the effect of variations of the velocity of said memory path.

17. The combination according to claim 16 in which each of said generators produces a distinctive signal and which includes means for combining said distinctive signals to provide a composite signal, said combining means being located intermediate said generators and said head means.

18. The combination according to claim 17 in which said recorder is a magnetic recorder and said head means is a single recording head.

19. In combination, transducer means adapted to sense the presence and extent of a measurable variable quality of a device and operable to provide a frequency modulated alternating current signal varying according to the variations of said quality, means responsive to spoken intelligence for producing a distinctive voice modulated signal, means for combining said signals into a composite signal, a recorder comprising a movable memory path, drive means for moving said memory path, and a recording head coupled with said combining means for recording said composite signal on said memory path, and means interconnecting said transducer means and said drive means thereby relating the frequency of said frequency modulated signal to the velocity of said memory path to eliminate the effect of variations in the velocity of said memory path.

20. A transducer device adapted to provide a set of distinctive frequency modulated alternating current signals representative of a set of predetermined measurable qualities, comprising a first rotatable member having a radially extending surface concentric with the axis of rotation thereof, means for rotatably driving said first rotatable member, an alternating current generator for each quality, each generator having a rotatable armature for providing a distinctive signal having a frequency related to the rotative speed thereof, a second rotatable member for each of said generators, the second rotatable member and the armature for each of said signal generators being interconnected to rotate in unison, each of said second rotatable members having a peripheral surface in frictional engagement with said first rotatable member, said second rotatable members together with their respective signal generators being spaced about said radially extending surface and being independently shiftable radially relative said first rotatable member with said second rotatable members in frictional engagement therewith to effect a change in their relative rotative speeds, and an individual quality sensing mechanism for each of said qualities, each mechanism being adapted to sense the presence and extent of its respective quality and operable in response to the variations thereof to shift its associated second rotatable member and signal generator radially relative to said first rotatable member an amount corresponding to the variation of the quality.

21. Apparatus for operating a subject structure from a movable memory path having a previously recorded frequency modulated signal thereon for controlling a measurable quality of the subject structure in accordance with said signal, comprising playback means adapted to reproduce said signal from said memory path, transducer means adapted to be connected to said subject structure, said transducer means being adapted to sense the presence and extent of said quality in said structure and operable to provide a frequency modulated condition indicating signal corresponding to the variation of said quality in said structure, frequency comparator means coupled with said playback means and said transducer means for comparing said reproduced signal and said condition indicating signal, said comparator means being operable to sample said reproduced signal and said condition indicating signal alternately at a predetermined frequency for providing a control signal representative of the frequency difference therebetween, and means coupled with said comparator means and adapted to actuate said subject structure in response to said control signal to eliminate said difference.

22. Apparatus for operating a subject structure from a movable memory path having an actuating means and having a previously recorded signal thereon indicating variations in the extent of a measurable quality of the subject structure by variations in said signal, comprising playback means adapted to reproduce said signal from said memory path, transducer means adapted to be connected to said structure and adapted to sense the presence and extent of said quality in said structure and operable to provide a condition indicating signal corresponding to the variations of said quality in said structure, means responsive to said actuating means for effecting corrective variations in said condition indicating signal in response to variations in the speed of said memory path occurring during operation of said playback means, and means coupled to said playback means and said transducer means for controlling said structure in response to the difference between said reproduced signal and said condition indicating signal.

23. Apparatus for operating a subject structure from a movable memory path having a previously recorded signal thereon indicating variations in the extent of a measurable quality of the subject structure by changes in frequency of the recorded signal, comprising playback means comprising a playback head adapted to reproduce said signal from said memory path, and drive means adapted to move said memory path, transducer means adapted to sense the presence and extent of said quality in said subject structure and operable to provide a frequency modulated condition indicating signal in accordance with the variation of said quality, means for further varying the frequency of said condition indicating signal in accordance with the velocity of said memory path to eliminate the effect of variations of said velocity, frequency comparator means coupled to said playback head and said transducer means for comparing said reproduced signal and said condition indicating signal, said comparator means being operable to sample said reproduced signal and said condition indicating signal alternately at a predetermined frequency for providing an output representative of the difference therebetween, and means coupled with said comparator means for controlling said subject structure in response to said control signal to eliminate said difference.

24. Apparatus for operating a subject structure from a movable memory path having a composite signal previously recorded thereon, the composite signal being at least one distinctive signal that indicates variations in the extent of one quality of the subject structure by changes in frequency and a distinctive voice modulated signal for spoken intelligence, comprising playback means adapted to reproduce said composite signal from said memory path, means coupled with said playback means for reproducing said spoken intelligence from said composite signal, means for reproducing said one distinctive signal from said composite signal, transducer means adapted to sense the presence and extent of at least said one quality in the subject structure and operable to provide a frequency modulated condition indicating signal corresponding to the variation of said one quality, frequency comparator means coupled with said playback means and said transducer means for comparing said reproduced distinctive signal and said condition indicating signal, said comparator means being operable to sample said reproduced signal and said condition indicating signal alternately at a predetermined frequency for providing a control signal representative of the difference therebetween, and means coupled with said comparator means and adapted to actuate said subject structure in response to said control signal to eliminate said difference substantially contemporaneously with the reproduction of said spoken intelligence.

25. Apparatus for operating a subject structure from a movable memory path having a composite signal previously recorded thereon for controlling each of a set of measurable qualities of the subject structure in accordance with distinctive frequency modulated signals forming said composite signal, comprising playback means adapted to reproduce said composite signal from said memory path, means coupled with said playback means for separating said composite signal into reproductions of said distinctive signals, transducer means adapted to be connected to said subject structure for sensing the presence and extent of each of said qualities therein and operable to provide a set of frequency modulated distinctive condition indicating signals corresponding to the respective variations of said qualities in said structure, a frequency comparator for each quality, each comparator being coupled to said separating means and said transducer means to compare the frequency of its reproduced signal and the corresponding condition indicating signal for its respective quality, said comparator means including means operable to sample said reproduced signal and said condition indicating signal alternately at a predetermined frequency for providing a control signal representative of the difference therebetween, and a controller for each of said comparators, each controller being coupled to its associated comparator and operable in response to said control signal to eliminate said difference.

26. Apparatus for rapidly responding to a rapidly changing frequency difference between first and second signal sources, comprising, frequency comparator means comprising two sets of input terminals, one set being connectable to said first frequency modulated signal source and the other set being connectable to said second frequency modulated signal source, a frequency measuring circuit having output terminal means, and switch means connected between said frequency measuring circuit and said sets of terminals, said switch means being responsive to power line frequency and operable in synchronism therewith to connect said frequency measuring circuit alternately to said sets of terminals, said switch means and said frequency measuring circuit cooperating to provide a substantially continuous alternating current line frequency output at said output terminal means substantially in phase with the power line frequency when the frequency of the signal from said one set of terminals is higher than the frequency from said other set of terminals and substantially 180° out of phase with the line frequency when the frequency of the signal from said one set of terminals is lower than the frequency from said other set of terminals, and a two-phase reversible servo-motor having a pair of field windings, one of said windings being coupled to the output terminal means of said frequency measuring circuit and the other of said windings being connectable to the power line, whereby a substantially continuous torque is developed in said motor when a difference between said frequencies exist and upon reversal of the phase of said output said motor is reversed.

27. The combination according to claim 26 in which said frequency measuring circuit comprises amplitude limiting means coupled to said switch means, differentiating and rectifying means connected in series to said limiting means, and a low pass filter in series with said differentiating and rectifying means.

28. Apparatus for controlling in a subject structure a measurable quality in a predetermined manner, comprising means for producing an alternating current frequency modulated signal representative of variations in said quality, means for recording said signal to provide a reproducing record thereof, means for reproducing said signal from said record, means for sensing the presence and extent of said quality in the subject structure and for producing and frequency modulating a condition indicating signal in accordance therewith, and means for controlling said subject structure, said controlling means comprising frequency measuring means connected to measure the frequencies of said signals, synchronous switch means responsive to power line frequency connected to said frequency measuring means, said switch means and said frequency measuring means cooperating to provide an alternating current line frequency output substantially in phase with the power line frequency when the frequency of one of said signals is higher than the frequency of the other of said signals and substantially 180° out of phase when the frequency of said one signal is lower than the frequency of said other signal, and a two-phase reversible control actuating servo-motor having a pair of field windings, one of said windings being connected to be energized by said output and the other of said windings being connectable to the power line, whereby upon reversal of the phase of said output said motor is reversed.

29. Apparatus for reproducing in a subject structure a set of measurable qualities of a pilot structure varying under operational conditions, comprising first transducer means for sensing the presence and extent of each of said qualities in said pilot structure as said qualities vary under operational conditions and for producing a distinctive electrical signal corresponding to each of said qualities, means for combining said signals into a composite signal, means for recording said composite signal to produce a reproducing record thereof, means for reproducing said distinctive signals from said reproduced composite signal, second transducer means for sensing the presence and extent of each of said qualities in said subject structure as said qualities vary and for producing a distinctive electrical condition indicating signal corresponding to each of said qualities, and means operable in response to the differences between said reproduced distinctive signals and the respective condition indicating signals for controlling said subject structure to eliminate said differences, said transducer means each including a variable frequency alternating current signal generator and sensing means for sensing the presence and extent of one of said qualities and operable in response to variations of said quality to vary the frequency of said signal generator accordingly, said signal generator comprising a rotatable element of magnetic material, a coil adjacent said rotatable element, a core element of magnetic material disposed in said coil adjacent said rotatable member, one of said elements having permanent magnet properties and said rotatable element having means for intermittently changing the magnetic flux to which said coil is subjected for inducing an alternating current in said coil upon rotation of said rotatable element relative to said core element, and a variable speed drive shiftable by said sensing means according to the variations of said quality.

30. Apparatus for reproducing in a subject engine a set of measurable qualities of a pilot engine varying under operational conditions, comprising first transducer means for sensing the presence and extent of each of said qualities in said pilot engine as said qualities vary under operational conditions and for producing a distinctive electrical signal corresponding to each of said qualities, means for combining said signals into a composite signal, means for recording said composite signal to produce a reproducing record thereof, means for reproducing said composite signal from said record, means for reproducing said distinctive signals from said reproduced composite signal, second transducer means for sensing the presence and extent of each of said qualities in said subject engine as said qualities vary and for producing a distinctive electrical condition indicating signal corresponding to each of said qualities, each of said transducer means including an alternating current generation adapted to be driven in timed relation with its associated engine to provide a signal having a frequency that varies according to the rotative speed of the engine, and means operable in response to the differences between said reproduced distinctive signals and the respective condition indicating signals for controlling said subject engine to eliminate said difference.

31. Apparatus for reproducing in a subject engine a set of measurable qualities of a pilot engine varying under operational conditions, comprising first transducer means for sensing the presence and extent of each of said qualities in said pilot engine as said qualities vary under operational conditions and for producing a distinctive electrical signal corresponding to each of said qualities, means for combining said signals into a composite signal, means for recording said composite signal to produce a reproducing record thereof, means for reproducing said composite from said record, means for reproducing said distinctive signals from said reproduced composite signal, second transducer means for sensing the presence and extent of each of said qualities in said subject engine as said qualities vary and for producing a distinctive electrical condition indicating signal corresponding to each of said qualities, each of said transducer means including a variable frequency oscillator adapted to be connected to the throttle of its associated engine to provide a signal having a frequency that varies according to the position of its associated throttle, said oscillators being adjusted to the same frequency band to provide substantially identical responses to identical throttle positions, and means operable in response to the differences between said reproduced distinctive signals and the respective condition indicating signals for controlling said subject engine to eliminate said difference.

32. A transducer adapted to provide a frequency modulated alternating current signal representative of a predetermined measurable quality of a device, comprising an alternating current generator having a rotatable armature the rotative speed of which determines the frequency of the signal generated thereby, an infinitely variable speed drive connected for rotating said armature, and means for sensing the presence and extent of said quality and operable in response to variations in said quality to vary the speed of said drive an amount corresponding to the variation of said quality, said rotatable armature being a drum provided with a circumferentially extending memory path of magnetic material adapted to have an alternating current signal recorded thereon, said generator including a playback head disposed adjacent said memory path for reproducing the alternating current signal therefrom as said drum is rotated, whereby the frequency of the signal as reproduced is related to the rotative speed of the drum.

33. A transducer adapted to provide a frequency modulated alternating current signal representative of a predetermined measurable quality of a device, comprising a housing, a first rotatable member rotatably journaled in said housing and having a radially extending surface concentric with the axis of rotation thereof, means for rotatively driving said first rotatable member, a second rotatable member carried by said housing and having a peripheral surface in frictional engagement with said first rotatable member, said second rotatable member being shiftable radially relative to said first rotatable member while in frictional engagement therewith to effect a change in their relative speeds, an alternating current generator having a rotatable armature connected to said second rotatable member to produce an alternating current signal having a frequency related to the rotative speed of said second rotatable member, said housing having an elongated shaft extending generally radially relative to said first rotatable member parallel to said concentric surface, said second rotatable member and said signal generator being slidably mounted as a unit on said shaft, and means for sensing the presence and extent of said quality comprising a bellows operable in response to the changes of said quality, said bellows having one end rigidly mounted on said housing, and a linkage interconnecting the other end of said bellows and said unit to slide the latter along said shaft as said bellows extends and retracts.

References Cited in the file of this patent

UNITED STATES PATENTS

| | | |
|---|---|---|
| 2,084,800 | Gartner | June 22, 1937 |
| 2,153,470 | McNeil | Apr. 4, 1939 |
| 2,176,742 | LaPierre | Oct. 17, 1939 |
| 2,378,383 | Arndt | June 19, 1945 |
| 2,424,833 | Korman | July 29, 1947 |
| 2,475,245 | Leaver et al. | July 5, 1949 |
| 2,579,831 | Keinath | Dec. 25, 1951 |
| 2,640,106 | Wilson et al | May 26, 1953 |
| 2,700,301 | Thomsen | Jan. 25, 1955 |
| 2,714,202 | Downing | July 26, 1955 |
| 2,755,422 | Livingston | July 17, 1956 |
| 2,839,615 | Sarratt | June 17, 1958 |

FOREIGN PATENTS

| | | |
|---|---|---|
| 332,468 | Germany | Feb. 2, 1921 |
| 548,742 | Great Britain | Oct. 22, 1942 |